(12) United States Patent
Sawada et al.

(10) Patent No.: US 12,596,391 B2
(45) Date of Patent: Apr. 7, 2026

(54) POWER SUPPLY CONTROL APPARATUS

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Ryohei Sawada, Yokkaichi (JP); Kota Oda, Yokkaichi (JP); Ken Furuto, Yokkaichi (JP); Masayuki Kato, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 1046 days.

(21) Appl. No.: 17/754,166

(22) PCT Filed: Aug. 25, 2020

(86) PCT No.: PCT/JP2020/032009
§ 371 (c)(1),
(2) Date: Mar. 25, 2022

(87) PCT Pub. No.: WO2021/059826
PCT Pub. Date: Apr. 1, 2021

(65) Prior Publication Data
US 2022/0291703 A1 Sep. 15, 2022

(30) Foreign Application Priority Data
Sep. 26, 2019 (JP) ................................. 2019-175971

(51) Int. Cl.
*H05B 1/02* (2006.01)
*B60N 2/00* (2006.01)
(Continued)

(52) U.S. Cl.
CPC ....... *G05D 23/2401* (2013.01); *B60N 2/0021* (2023.08); *B60N 2/5685* (2013.01); *H05B 1/0238* (2013.01); *B60N 2210/40* (2023.08)

(58) Field of Classification Search
CPC .. H05B 1/0238; B60N 2/5685; B60N 2/0021; G05D 23/2401
(Continued)

(56) References Cited

U.S. PATENT DOCUMENTS 8,091,960 B2 * 1/2012 Kincaid ............... B60N 2/0035
219/202
8,217,308 B2 * 7/2012 Asami .................. B60N 2/5685
219/217
(Continued)

FOREIGN PATENT DOCUMENTS

JP H9-306637 A 11/1997
JP 2008-300114 A 12/2008
(Continued)

OTHER PUBLICATIONS

International Search Report, Application No. PCT/JP2020/032009, mailed Oct. 20, 2020. ISA/Japan Patent Office.

*Primary Examiner* — Jimmy Chou
(74) *Attorney, Agent, or Firm* — Brooks Kushman PC

(57) ABSTRACT

A heater drive apparatus functions as a power supply control apparatus, and controls power supply to an electrical heating wire. In the heater drive apparatus, a current output circuit and a detection resistor function as a current detection unit, and detect a current flowing through the electrical heating wire. A microcomputer repeatedly calculates an electrical heating wire temperature relating to the electrical heating wire based on the detected current. A drive circuit functions (Continued)

LEGEND
A= Microcomputer as a switching unit, and switches a switch on or off in accordance with the calculated electrical heating wire temperature.

9 Claims, 16 Drawing Sheets

(51) Int. Cl.
*B60N 2/56* (2006.01)
*G05D 23/24* (2006.01)

(58) Field of Classification Search
USPC ......................................................... 219/202
See application file for complete search history.

(56) References Cited

U.S. PATENT DOCUMENTS

| | | | | | |
|---|---|---|---|---|---|
| 8,324,538 | B2 * | 12/2012 | Schwerman | ........... | G05D 23/19 |
| | | | | | 219/490 |
| 9,045,066 | B2 * | 6/2015 | Mizuno | ................ | B60N 2/5685 |
| | | | | | 219/202 |
| 2006/0289455 | A1 * | 12/2006 | Nakamura | .............. | F24H 1/102 |
| | | | | | 219/494 |
| 2009/0095725 | A1 * | 4/2009 | Ohashi | ................. | B60N 2/5685 |
| | | | | | 219/217 |
| 2010/0038351 | A1 * | 2/2010 | Tabaczynski | ............. | B60L 1/08 |
| | | | | | 219/217 |
| 2010/0096379 | A1 * | 4/2010 | Asami | ................. | B60N 2/0034 |
| | | | | | 219/217 |
| 2011/0139766 | A1 * | 6/2011 | Katayama | ......... | G02F 1/133382 |
| | | | | | 219/494 |
| 2011/0186560 | A1 * | 8/2011 | Kennedy | .............. | B60N 2/5657 |
| | | | | | 219/217 |
| 2012/0193338 | A1 * | 8/2012 | Sullivan | .................... | B60S 1/66 |
| | | | | | 219/202 |
| 2013/0193129 | A1 * | 8/2013 | Jones | ...................... | B60S 1/381 |
| | | | | | 15/250.07 |
| 2013/0270874 | A1 * | 10/2013 | Lamesch | .............. | B60N 2/0035 |
| | | | | | 297/180.12 |
| 2014/0166636 | A1 * | 6/2014 | Naydenov | ................. | F01N 9/00 |
| | | | | | 219/494 |
| 2015/0003493 | A1 * | 1/2015 | Bieck | ........................ | G01G 9/00 |
| | | | | | 374/51 |
| 2015/0116883 | A1 * | 4/2015 | Kimoto | .................. | H02H 6/005 |
| | | | | | 361/103 |
| 2016/0075365 | A1 * | 3/2016 | Chascsa, II | ............. | B60R 16/03 |
| | | | | | 219/204 |
| 2018/0026436 | A1 * | 1/2018 | Furuto | ..................... | H02H 5/04 |
| | | | | | 307/117 |
| 2020/0406712 | A1 | 12/2020 | Tanaka et al. | | |
| 2021/0031657 | A1 | 2/2021 | Sato et al. | | |

FOREIGN PATENT DOCUMENTS

| | | | |
|---|---|---|---|
| JP | 2013-001360 | A | 1/2013 |
| JP | 2014209824 | A * | 11/2014 |
| JP | 2015-047379 | A | 3/2015 |
| JP | 2019-138567 | A | 8/2019 |
| WO | 2007-102502 | A1 | 9/2007 |

* cited by examiner

LEGEND
A= Microcomputer

POWER SUPPLY CONTROL APPARATUS

CROSS-REFERENCE TO RELATED APPLICATIONS

This application is the U.S. national stage of PCT/JP2020/032009 filed on Aug. 25, 2020, which claims priority of Japanese Patent Application No. JP 2019-175971 filed on Sep. 26, 2019, the contents of which are incorporated herein.

TECHNICAL FIELD

The present disclosure relates to a power supply control apparatus.

BACKGROUND

WO 2007/102502 and JP 2013-1360A each disclose a power supply control apparatus for controlling power supply to an electrical heating wire disposed in a seat of a vehicle. In the power supply control apparatus described in WO 2007/102502 or JP 2013-1360A, a temperature detection unit for detecting the temperature of the electrical heating wire is disposed in the vicinity of the electrical heating wire. A switch disposed on a path of a current that flows from a DC power source to the electrical heating wire is switched on or off in accordance with the temperature of the electrical heating wire detected by the temperature detection unit. Accordingly, the temperature of the electrical heating wire is kept at an appropriate temperature.

In a conventional power supply control apparatus such as those described in WO 2007/102502 and JP 2013-1360A, control unit for instructing that a switch is to be switched on or off and a temperature detection unit need to be connected by a connection line. As described above, the temperature detection unit is disposed in the vicinity of the electrical heating wire. Thus, in the conventional power supply control apparatus, there is a problem in that the arrangement of the connection line that connects the control unit and the temperature detection unit is significantly restricted.

In view of this, an object of the present disclosure is to provide a power supply control apparatus in which an element for detecting a temperature does not need to be disposed in the vicinity of an electrical heating wire.

SUMMARY

A power supply control apparatus according to one aspect of the present disclosure is a power supply control apparatus for controlling power supply to an electrical heating wire, the apparatus including: a current detection unit configured to detect a current flowing through the electrical heating wire; a switch that is disposed on a path of the current that flows through the electrical heating wire; a processing unit configured to execute processing; and a switching unit configured to switch the switch on or off, the processing unit executing processing for repeatedly calculating an electrical heating wire temperature relating to the electrical heating wire based on the current detected by the current detection unit, and the switching unit switching the switch on or off in accordance with the electrical heating wire temperature calculated by the processing unit.

Advantageous Effects of Present Disclosure

According to the present disclosure, an element for detecting a temperature does not need to be disposed in the vicinity of an electrical heating wire.

DETAILED DESCRIPTION OF PREFERRED EMBODIMENTS

Figure 1:
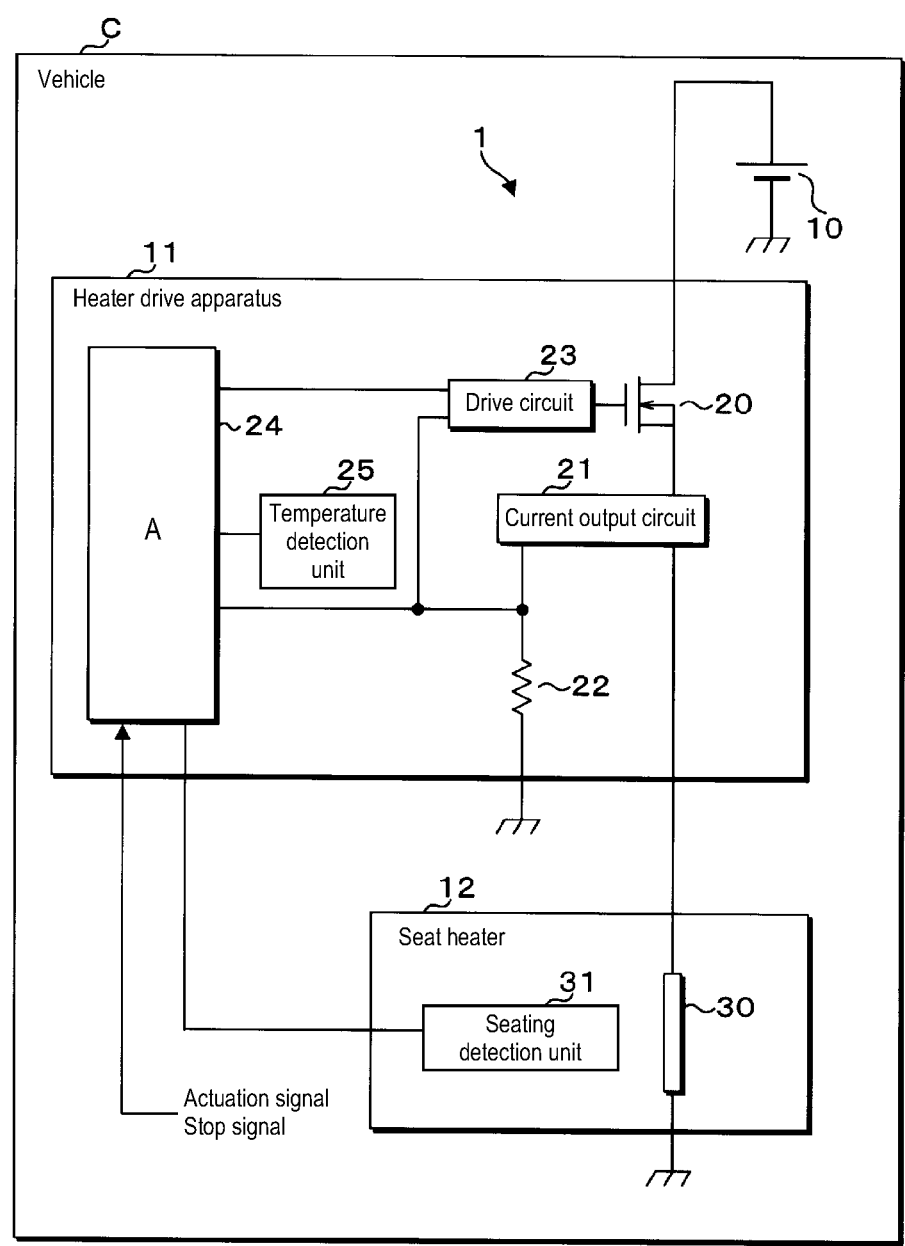
FIG. 1 is a block diagram showing the main configuration of a power source system according to a first embodiment.

First, embodiments of the present disclosure will be listed and described. At least some of the embodiments to be described below may be suitably combined.

A power supply control apparatus according to one aspect of the present disclosure is a power supply control apparatus for controlling power supply to an electrical heating wire, the apparatus including: a current detection unit configured to detect a current flowing through the electrical heating wire; a switch that is disposed on a path of the current that flows through the electrical heating wire; a processing unit configured to execute processing; and a switching unit configured to switch the switch on or off, the processing unit executing processing for repeatedly calculating an electrical heating wire temperature relating to the electrical heating wire based on the current detected by the current detection unit, and the switching unit switching the switch on or off in accordance with the electrical heating wire temperature calculated by the processing unit.

In the above-described aspect, the electrical heating wire temperature is calculated based on the current flowing through the electrical heating wire, and thus an element for detecting the temperature does not need to be disposed in the vicinity of the electrical heating wire.

The power supply control apparatus according to one aspect of the present disclosure further includes a temperature detection unit configured to detect an ambient temperature of the electrical heating wire, and the processing unit executes processing for repeatedly calculating the electrical heating wire temperature based on the current detected by the current detection unit and the ambient temperature detected by the temperature detection unit.

In the above-described aspect, the electrical heating wire temperature is calculated based on the current flowing through the electrical heating wire and the ambient temperature of the electrical heating wire. Thus, an accurate electrical heating wire temperature is calculated.

The power supply control apparatus according to one aspect of the present disclosure further includes an obtaining unit configured to obtain seating information indicating whether or not a person is seated on a seat of a vehicle, the electrical heating wire is disposed in the seat, and the processing unit executes processing for changing a value of a variable that is used in a formula for calculating the electrical heating wire temperature, in accordance with the seating information obtained by the obtaining unit.

In the above-described aspect, the value of the variable that is used in the formula for calculating the electrical heating wire temperature is changed in accordance with the seating information, or in other words, whether or not a person is seated on the seat, and thus an accurate electrical heating wire temperature is calculated.

In the power supply control apparatus according to one aspect of the present disclosure, the switching unit switches the switch on if the electrical heating wire temperature calculated by the processing unit is lower than a first threshold value, and switches the switch off if the electrical heating wire temperature calculated by the processing unit is higher than or equal to a second threshold value, and the first threshold value is lower than the second threshold value.

In to the above-described aspect, the switch is switched on if the electrical heating wire temperature is lower than the first threshold value, and the switch is switched off if the electrical heating wire temperature is higher than or equal to the second threshold value. Thus, the electrical heating wire temperature is kept at a temperature that is lower than the first threshold value and higher than or equal to the second threshold value.

In the power supply control apparatus according to one aspect of the present disclosure, when power supply to the electrical heating wire is started, the switching unit keeps the switch on until the electrical heating wire temperature calculated by the processing unit reaches a fixed target value or higher, and executes PWM control for alternately repeating switching of the switch on and off when the electrical heating wire temperature calculated by the processing unit reaches the target value or higher, and the processing unit executes processing for decreasing a duty of the PWM control when the calculated electrical heating wire temperature exceeds the target value, and for increasing the duty when the calculated electrical heating wire temperature is lower than the target value.

In the above-described aspect, when power supply to the electrical heating wire is started, the switching unit keeps the switch on until the electrical heating wire temperature reaches the target value or higher. Accordingly, the electrical heating wire temperature rapidly increases to the target value. After the electrical heating wire temperature has reached the target value or higher, the duty is changed such that the electrical heating wire temperature is at the target value.

In the power supply control apparatus according to one aspect of the present disclosure, when power supply to the electrical heating wire is started, the switching unit keeps the switch on until the electrical heating wire temperature calculated by the processing unit reaches a fixed first target value or higher, and executes PWM control for repeatedly switching the switch alternately on and off when the electrical heating wire temperature calculated by the processing unit reaches the first target value or higher, and the processing unit executes processing for adjusting a duty of the PWM control based on a difference between the calculated electrical heating wire temperature and a fixed second target value, and the second target value exceeds the first target value.

In the above-described aspect, when power supply to the electrical heating wire is started, the switching unit keeps the switch on until the electrical heating wire temperature reaches the first target value or higher. Accordingly, the electrical heating wire temperature rapidly increases to the first target value. The duty is then adjusted based on the difference between the electrical heating wire temperature and the second target value.

Specific examples of a power source system according to embodiments of the present disclosure will be described below with reference to the drawings. Note that the present invention is not limited to these illustrative examples, and is defined by the claims, and all changes which come within the meaning and range of equivalency of the claims are intended to be embraced therein.

First Embodiment

Configuration of Power Source System

FIG. 1 is a block diagram showing the main configuration of a power source system 1 according to a first embodiment. The power source system 1 is suitably mounted in a vehicle C, and includes a battery 10, a heater drive apparatus 11, and a seat heater 12. The seat heater 12 is disposed in a seat 13 of the vehicle C (see FIG. 2). The positive electrode of the battery 10 is connected to the heater drive apparatus 11. The heater drive apparatus 11 is also connected to the seat heater 12. The negative electrode of the battery 10 and the seat heater 12 are grounded. Such grounding is realized through connection to the body of the vehicle C, for example.

The heater drive apparatus 11 includes a switch 20. The seat heater 12 includes an electrical heating wire 30. A current flows from the positive electrode of the battery 10 to the electrical heating wire 30 via the switch 20, and returns to the negative electrode of the battery 10. The electrical heating wire 30 is a metal wire that has a high resistance value, and contains Nichrome, iron-chrome, or the like. When a current flows through the electrical heating wire 30, the electrical heating wire 30 generates heat. Accordingly, the temperature of the seat 13 increases, and the temperature in the vehicle C increases.

An actuation signal instructing that the seat heater 12 be actuated and a stop instruction instructing that the operation of the seat heater 12 be stopped are input to the heater drive apparatus 11. When the actuation signal is input, the heater drive apparatus 11 switches the switch 20 on. Accordingly, the battery 10 supplies power to the electrical heating wire 30 of the seat heater 12 via the switch 20. As a result, a current flows through the electrical heating wire 30, and the electrical heating wire 30 generates heat.

When the stop signal is input, the heater drive apparatus 11 switches the switch 20 off. Accordingly, power supply from the battery 10 to the electrical heating wire 30 stops, and the flow of a current via the electrical heating wire 30 stops. As a result, the electrical heating wire 30 stops generating heat, and the temperature of the electrical heating wire 30 decreases.

As described above, the heater drive apparatus 11 controls power supply to the electrical heating wire 30 by switching the switch 20 on or off. The heater drive apparatus 11 functions as a power supply control apparatus.

Note that the number of seats 13 that are installed in the vehicle C is not limited to one, and may be two or more. If the number of seats 13 is two or more, the heater drive apparatus 11 and the seat heater 12 are disposed in each of the seats 13.

Configurations of Heater Drive Apparatus 11 and Seat Heater 12

In addition to the switch 20, the heater drive apparatus 11 includes a current output circuit 21, a detection resistor 22, a drive circuit 23, a microcomputer 24, and a temperature detection unit 25. The switch 20 is an N-channel FET (Field Effect Transistor). The seat heater 12 includes a seating detection unit 31 in addition to the electrical heating wire 30.

The drain of the switch 20 of the heater drive apparatus 11 is connected to the positive electrode of the battery 10. The source of the switch 20 is connected to the current output circuit 21. The current output circuit 21 is also connected to one end of the electrical heating wire 30 of the seat heater 12. The other end of the electrical heating wire 30 is grounded. The current output circuit 21 is also connected to one end of the detection resistor 22. The other end of the detection resistor 22 is grounded.

The gate of the switch 20 is connected to the drive circuit 23. The drive circuit 23 is also connected to the microcomputer 24. The connection node between the current output circuit 21 and the detection resistor 22 is connected to the drive circuit 23 and the microcomputer 24. The temperature detection unit 25 and the seating detection unit 31 of the seat heater 12 are connected to the microcomputer 24.

If the voltage of the gate of the switch 20 that is based on the potential of the source thereof is higher than or equal to a fixed voltage, the switch 20 is on. In this case, a current can flow via the drain and the source. If the voltage of the gate of the switch 20 that is based on the potential of the source thereof is lower than the fixed voltage, the switch 20 is off. In this case, a current does not flow via the drain and the source.

The drive circuit 23 increases the voltage of the gate of the switch 20 that is based on the ground potential. Accordingly, the voltage of the gate of the switch 20 that is based on the potential of the source thereof reaches a fixed voltage or higher, and the switch 20 is switched on. When the switch 20 is on, a current flows from the positive electrode of the battery 10 through the drain and the source of the switch 20 in the stated order. A current output from the source of the switch 20 flows through the current output circuit 21 and the electrical heating wire 30 in the stated order, and is input to the negative electrode of the battery 10.

As described above, the switch 20 is disposed on a path of a current that flows through the electrical heating wire 30. When the switch 20 is on, a current flows through the electrical heating wire 30, and the electrical heating wire 30 generates heat.

The current output circuit 21 is constituted by a current mirror circuit, for example. The current output circuit 21 outputs a current that is a predetermined fraction such as one thousandth of a current that flows through the electrical heating wire 30, to the detection resistor 22. A voltage between the two ends of the detection resistor 22 is input to the drive circuit 23 and the microcomputer 24. Hereinafter, a current that flows through the electrical heating wire 30 is referred to as an "electrical heating wire current", and the voltage between the two ends of the detection resistor 22 is referred to as an "end-to-end voltage".

The end-to-end voltage of the detection resistor 22 is indicated by (electrical heating wire current)·(resistance value of detection resistor 22)/(predetermined number). "·" indicates multiplication. The resistance value of the detection resistor 22 is a fixed value, and thus the end-to-end voltage of the detection resistor 22 is proportional to the electrical heating wire current, and functions as current information indicating the electrical heating wire current. The electrical heating wire current is indicated by (voltage between two ends of detection resistor 22)·(predetermined number)/(resistance value of detection resistor 22).

In this manner, the current output circuit 21 and the detection resistor 22 detect an electrical heating wire current, and function as a current detection unit.

The drive circuit 23 decreases the voltage of the gate of the switch 20 that is based on the ground potential. Accordingly, the voltage of the gate of the switch 20 that is based on the potential of the source thereof decreases below a fixed voltage, and the switch 20 is switched off. When the switch 20 is switched off, a flow of a current via the electrical heating wire 30 stops, and the electrical heating wire 30 stops generating heat. The drive circuit 23 functions as a switching unit for switching the switch 20 on or off.

The microcomputer 24 outputs, to the drive circuit 23, an ON instruction instructing that the switch 20 be switched on and an OFF instruction instructing that the switch 20 be switched off. As described above, the end-to-end voltage of the detection resistor 22 is input to the drive circuit 23. When the ON instruction is input from the microcomputer 24 in a case where the electrical heating wire current indicated by the end-to-end voltage of the detection resistor 22 is smaller than a fixed current threshold value, the drive circuit 23 switches the switch 20 on. When the OFF instruction is input from the microcomputer 24 in a similar case, the drive circuit 23 switches the switch 20 off. The current threshold value exceeds zero A.

When the electrical heating wire current indicated by the end-to-end voltage of the detection resistor 22 reaches the current threshold value or higher, the drive circuit 23 switches the switch 20 off regardless of an instruction that is input from the microcomputer 24. The drive circuit 23 then keeps the switch 20 off regardless of an instruction that is input from the microcomputer 24 and the electrical heating wire current indicated by the end-to-end voltage of the detection resistor 22.

As described above, when the electrical heating wire current reaches the current threshold value or higher, the drive circuit 23 switches the switch 20 off, and keeps the switch 20 off. Thus, an overcurrent that exceeds the current threshold value does not flows through the electrical heating wire 30.

The temperature detection unit 25 detects the temperature of the environment in which the switch 20, the current output circuit 21, the detection resistor 22, the drive circuit 23, and the microcomputer 24 are disposed. This temperature substantially matches the ambient temperature of the electrical heating wire 30. The temperature detection unit 25 outputs ambient temperature information indicating the detected ambient temperature of the electrical heating wire 30 to the microcomputer 24. The ambient temperature information is an analog value, and, for example, is a voltage that changes in accordance with the detected ambient temperature. Since the temperature detection unit 25 does not need to be disposed in the vicinity of the electrical heating wire 30, arrangement of a connection line that is connected to the temperature detection unit 25 is not significantly restricted.

Figure 2:
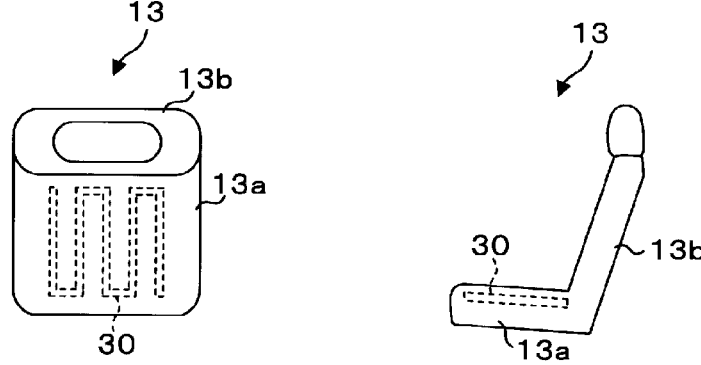
FIG. 2 is a diagram illustrating arrangement of an electrical heating wire.

FIG. 2 is a diagram illustrating arrangement of the electrical heating wire 30. FIG. 2 shows a flat surface and a side surface of the seat 13. As described above, the seat 13 is installed in the vehicle C. The seat 13 includes a rectangular parallelepiped seating portion 13a on which a person is to be seated and a backrest portion 13b against which the person is to be leant. The backrest portion 13b protrudes upward from the rear side of the upper surface of the seating detection unit 31. The electrical heating wire 30 is disposed in the seating portion 13a of the seat 13.

The seating detection unit 31 shown in FIG. 1 detects seating of a person on the seat 13. The seating detection unit 31 detects pressure applied to the seating portion 13a, for example. With this configuration, the seating detection unit 31 does not detect seating of a person when pressure applied to the seating portion 13a is lower than a fixed value. When pressure applied to the seating portion 13a is higher than or equal to the fixed value, the seating detection unit 31 detects seating. The seating detection unit 31 periodically outputs seating information indicating whether or not a person is seated on the seating portion 13a of the seat 13 of the vehicle C to the microcomputer 24.

An actuation signal and a stop signal are input to the microcomputer 24. The microcomputer 24 repeatedly calculates the temperature of the electrical heating wire 30 based on the end-to-end voltage of the detection resistor 22, ambient temperature information that is input from the temperature detection unit 25, and seating information input from the seating detection unit 31 of the seat heater 12. Hereinafter, the temperature of the electrical heating wire 30 is referred to as an "electrical heating wire temperature".

When the actuation signal is input, the microcomputer 24 outputs an ON instruction or an OFF instruction to the drive circuit 23 in accordance with a calculated electrical heating wire temperature, and keeps the electrical heating wire temperature at a temperature that is higher than or equal to a first threshold value and is lower than a second threshold value. The first threshold value and second threshold value are fixed values, and exceed the ambient temperature of the electrical heating wire 30. The first threshold value is lower than the second threshold value.

When the stop signal is input, the microcomputer 24 outputs an OFF instruction to the drive circuit 23. Accordingly, the drive circuit 23 switches the switch 20 off, and the electrical heating wire 30 stops generating heat. In addition, when the calculated electrical heating wire temperature reaches a shut-off threshold value or higher, the microcomputer 24 outputs an OFF instruction to the drive circuit 23 regardless of a signal that is input to the microcomputer 24. After that, the microcomputer 24 does not output an ON instruction to the drive circuit 23. The shut-off threshold value exceeds the second threshold value.

Configuration of Microcomputer 24

Figure 3:
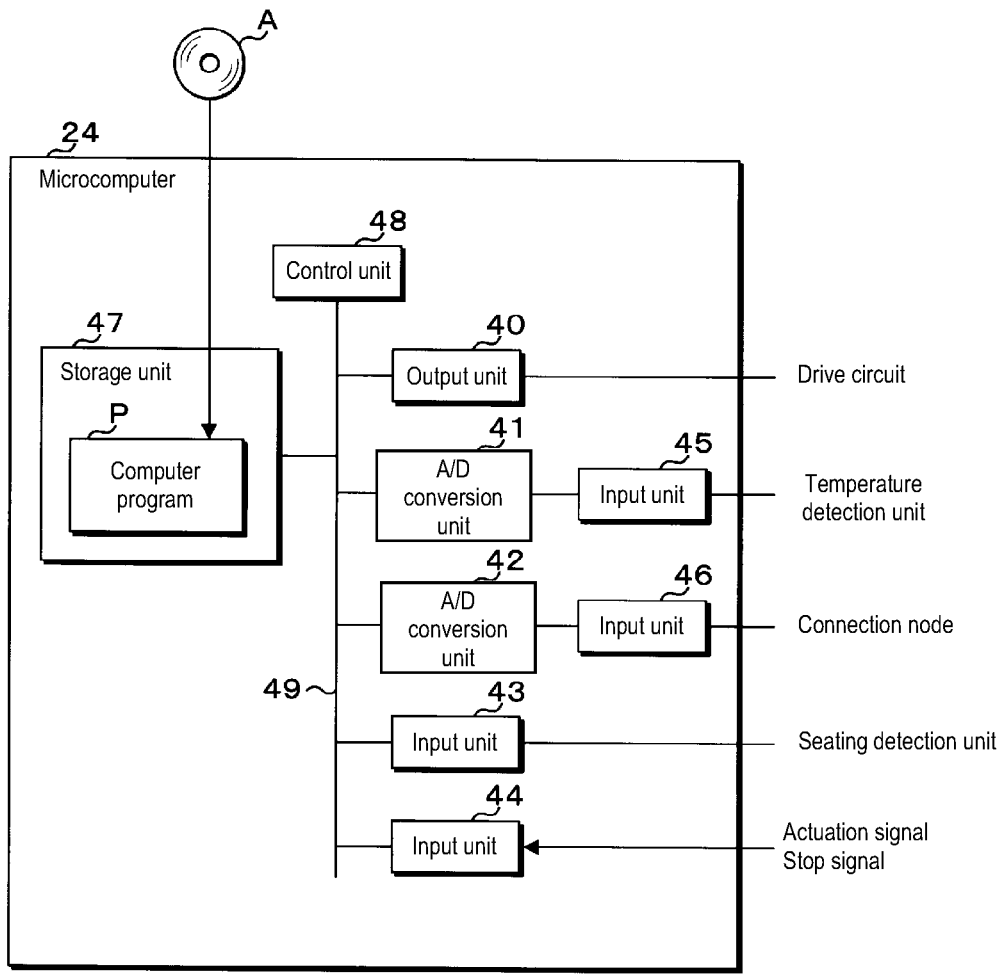
FIG. 3 is a block diagram showing the main configuration of a microcomputer.

FIG. 3 is a block diagram showing the main configuration of the microcomputer 24. The microcomputer 24 includes an output unit 40, A/D conversion units 41 and 42, input units 43, 44, 45, and 46, a storage unit 47, and a control unit 48. The output unit 40, the A/D conversion units 41 and 42, the input units 43 and 44, the storage unit 47, and the control unit 48 are connected to an internal bus 49. The output unit 40 is also connected to the drive circuit 23. The A/D conversion units 41 and 42 are also connected to the input units 45 and 46, respectively. The input unit 45 is also connected to the temperature detection unit 25. The input unit 46 is also connected to a connection node between the current output circuit 21 and the detection resistor 22. The input unit 43 is also connected to the seating detection unit 31 of the seat heater 12.

The output unit 40 outputs an ON instruction and an OFF instruction to the drive circuit 23 in accordance with an instruction given by the control unit 48.

Analog ambient temperature information is input from the temperature detection unit 25 to the input unit 45. When analog ambient temperature information is input, the input unit 45 outputs the input analog ambient temperature information to the A/D conversion unit 41. The A/D conversion unit 41 converts the analog ambient temperature information input from the input unit 45 into digital ambient temperature information. The control unit 48 obtains the digital ambient temperature information from the A/D conversion unit 41. The ambient temperature of the electrical heating wire 30 indicated by the ambient temperature information obtained by the control unit 48 substantially matches the ambient temperature detected by the temperature detection unit 25 at the time point when the ambient temperature information is obtained.

An analog end-to-end voltage is input from the connection node between the current output circuit 21 and the detection resistor 22 to the input unit 46. When the analog end-to-end voltage (of the detection resistor 22) is input, the input unit 46 outputs the input analog end-to-end voltage to the A/D conversion unit 42. The A/D conversion unit 42 converts the analog end-to-end voltage input from the input unit 46 into a digital voltage (between the two ends). The control unit 48 obtains the digital voltage (between the two ends) from the A/D conversion unit 42. The electrical heating wire current indicated by the end-to-end voltage obtained by the control unit 48 substantially matches the electrical heating wire current at the time point when the digital end-to-end voltage is obtained.

The seating detection unit 31 of the seat heater 12 periodically outputs seating information to the input unit 43. The control unit 48 obtains the seating information from the input unit 43. The control unit 48 functions as an obtaining unit.

An actuation signal and a stop signal are input to the input unit 44. When the actuation signal or the stop signal is input to the input unit 44, the input unit 44 notifies the control unit 48 of the input signal.

The storage unit 47 is a non-volatile memory. A computer program P is stored in the storage unit 47. The control unit 48 includes a processing element for executing processing, such as a CPU (Central Processing Unit), and also functions as a processing unit. The processing element (computer) of the control unit 48 executes temperature calculating processing for calculating an electrical heating wire temperature and power supply control processing for controlling power supply to the electrical heating wire 30, by executing the computer program P. The processing unit of the control unit 48 executes the temperature calculating processing and the power supply control processing in parallel in a time shared manner.

Note that the computer program P may also be stored in a storage medium A in a manner readable by the processing element of the control unit 48. In this case, the computer program P read out from the storage medium A by a reading apparatus (not illustrated) is written to the storage unit 47. The storage medium A is an optical disk, a flexible disk, a magnetic disk, a magnetic optical disk, a semiconductor memory, or the like. The optical disk is a CD (Compact Disk)-ROM (Read Only Memory), a DVD (Digital Versatile Disk)-ROM, a BD (Blu-ray (registered trademark) Disk), or the like. The magnetic disk is a hard disk, for example. In addition, a configuration may also be adopted in which the computer program P is downloaded from an external apparatus (not illustrated) connected to a communication network (not illustrated), and the downloaded computer program P is written to the storage unit 47.

In addition, the number of processing elements of the control unit 48 is not limited to one, and may also be two or larger. In this case, a plurality of processing elements may execute the temperature calculating processing and the power supply control processing in cooperation in accordance with the computer program P.

Formula for Calculating Electrical Heating Wire Temperature

In the temperature calculating processing, the control unit 48 calculates an electrical heating wire temperature based on the end-to-end voltage of the detection resistor 22, the ambient temperature of the electrical heating wire 30 indicated by the ambient temperature information, and the content of the seating information, or in other words, whether or not a person is seated on the seat 13. In calculation of the electrical heating wire temperature, the control unit 48 periodically calculates a temperature difference ΔTh between the electrical heating wire temperature and an ambient temperature Ta of the electrical heating wire 30 indicated by temperature information input from the temperature detection unit 25.

Specifically, the control unit 48 calculates an electrical heating wire current Ih by calculating (the end-to-end voltage of the detection resistor 22)·(a predetermined numeral)/ (the resistance value of the detection resistor 22). The control unit 48 calculates the temperature difference ΔTh by substituting a previously calculated prior temperature difference ΔTp, the electrical heating wire current Ih, and the ambient temperature Ta of the electrical heating wire 30 in Formula 1 and Formula 2 below.

$$\Delta Th = \Delta Tp \cdot \exp(-\Delta t/\tau r) + Rth \cdot Rh \cdot Ih^2 \cdot (1 - \exp(-\Delta t/\tau r)) \quad (1)$$

$$Rh = Ro \cdot (1 + \kappa \cdot (Ta + \Delta Tp - To)) \quad (2)$$

Variables and constants used in Formula 1 and Formula 2 will be described. In description of the variables and the constants, units of the variables or constants are also illustrated. As described above, ΔTh, ΔTp, Ta, and Ih respectively indicate a calculated temperature difference (° C.), a prior temperature difference (° C.), an ambient temperature (° C.) of the electrical heating wire 30, and a calculated electrical heating wire current (A). Rh and Rth respectively indicate the resistance value (Ω) and the thermal resistance value (° C./W) of the electrical heating wire 30. "Δt" indicates a cycle (s) in which the temperature difference ΔTh is calculated. "τr" indicates a heat dissipation time constant of the electrical heating wire 30.

"To" indicates a predetermined temperature (° C.), and "Ro" indicates the resistance value (Ω) of the electrical heating wire 30 at the temperature To. "κ" indicates the resistance temperature coefficient (/° C.) of the electrical heating wire 30. The temperature difference ΔTh, the prior temperature difference ΔTp, the ambient temperature Ta, the electrical heating wire current Ih, and the thermal resistance value Rth are variables. The resistance value Rh of the electrical heating wire 30, the cycle Δt, the heat dissipation time constant 1r, the resistance value Ro of the electrical heating wire 30, and the resistance temperature coefficient κ of the electrical heating wire, and the temperature To are preset constants.

The longer the cycle Δt is, the smaller the value of the first term of Formula 1 becomes, and thus the first term of Formula 1 indicates heat dissipation of the electrical heating wire 30. In addition, the longer the cycle Δt is, the longer the value of the second term of Formula 1 becomes, and thus the second term of Formula 1 indicates heat generation of the electrical heating wire 30.

The control unit 48 calculates an electrical heating wire temperature by adding, to the calculated temperature difference ΔTh, the ambient temperature Ta of the electrical heating wire 30 indicated by the ambient temperature information input from the temperature detection unit 25. The prior temperature difference ΔTp and an electrical heating wire temperature are stored in the storage unit 47.

The thermal resistance value Rth indicates the difficulty of heat transference. When a person is not seated on the seat 13, the upper side of the seating portion 13a of the seat 13 is covered with an air layer, and thus heat is not easily transferred. As a result, the thermal resistance value Rth is high. When a person is seated on the seat 13, the upper side of the seating portion 13a of the seat 13 is covered with a human body, and thus heat is easily transferred. As a result, the thermal resistance value Rth is low.

As described above, the thermal resistance value Rth changes in accordance with whether or not a person is seated on the seat 13. When a person is seated on the seat 13, the thermal resistance value Rth serves as a first setting value. When a person is not seated on the seat 13, the thermal resistance value Rth serves as a second setting value. The first setting value and the second setting value are fixed values, and are stored in the storage unit 47 in advance. The first setting value is lower than the second setting value.

Temperature Calculating Processing

Figure 4:
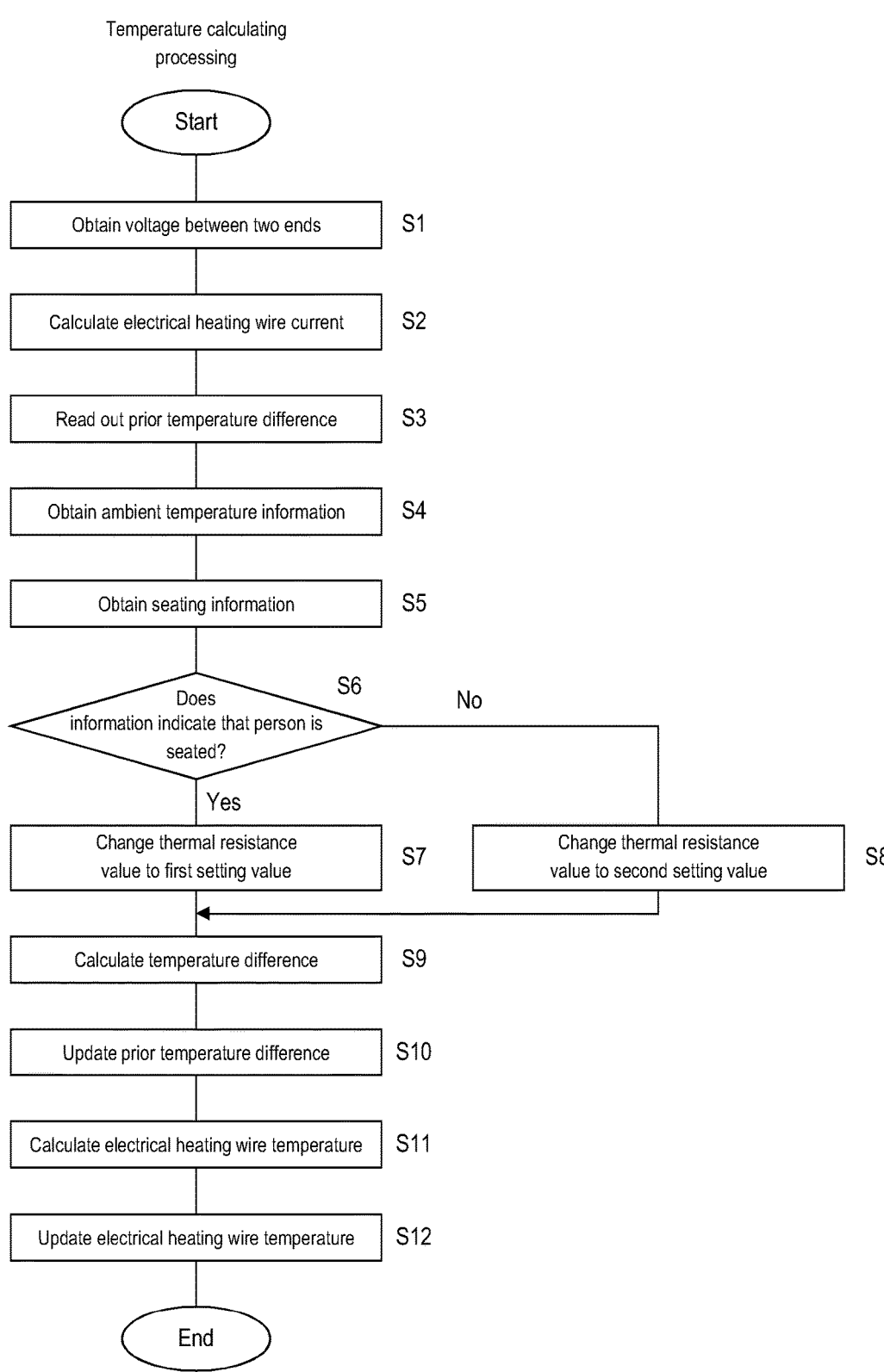
FIG. 4 is a flowchart showing a procedure of temperature calculating processing.

FIG. 4 is a flowchart showing the procedure of the temperature calculating processing. When the microcomputer 24 is in operation, the control unit 48 periodically executes the temperature calculating processing. In the temperature calculating processing, the control unit 48 obtains the end-to-end voltage of the detection resistor 22 from the A/D conversion unit 42 (step S1), and calculates an electrical heating wire current based on the obtained end-to-end voltage (step S2). As described above, the electrical heating wire current is indicated by (the end-to-end voltage of the detection resistor 22)·(a predetermined number)/(the resistance value of the detection resistor 22). The predetermined number and the resistance value of the detection resistor 22 are fixed values, and are set in advance.

Next, the control unit 48 reads out, from the storage unit 47, the prior temperature difference calculated in advance (step S3). Here, the prior temperature difference is a temperature difference calculated in the previous temperature calculating processing. In temperature calculating processing that is first executed from when the microcomputer 24 was actuated, the prior temperature difference is zero. After executing step S3, the control unit 48 obtains the ambient temperature information from the A/D conversion unit 41 (step S4). After executing step S4, the control unit 48 obtains seating information from the input unit 43 (step S5). Here, the seating information that is obtained by the control unit 48 is the most recent seating information input to the input unit 43.

Next, the control unit 48 determines whether or not the seating information obtained in step S5 indicates that a person is seated (step S6). If it is determined that the seating information indicates that a person is seated (step S6: YES), the control unit 48 changes the thermal resistance value related to the formula for calculating an electrical heating wire temperature to the first setting value (step S7). If it is determined that the seating information does not indicate that a person is seated (step S6: NO), the control unit 48 changes the thermal resistance value related to the formula for calculating an electrical heating wire temperature to the second setting value (step S8).

After executing step S7 or S8, the control unit 48 calculates a temperature difference by substituting the electrical heating wire current calculated in step S2, the prior temperature difference read out in step S3, and the ambient temperature of the electrical heating wire 30 indicated by the ambient temperature information obtained in step S4, to Formulas 1 and 2 (step S9). Next, the control unit 48 updates the prior temperature difference stored in the storage unit 47 to the temperature difference calculated in step S9 (step S10). The updated prior temperature difference is used for calculating an electrical heating wire temperature in the next temperature calculating processing.

After executing step S10, the control unit 48 calculates an electrical heating wire temperature by adding the temperature difference calculated in step S9 to the ambient temperature of the electrical heating wire 30 indicated by the ambient temperature information obtained in step S4 (step S11). Next, the control unit 48 updates the electrical heating wire temperature stored in the storage unit 47 to the electrical heating wire temperature calculated in step S11 (step S12). After executing step S12, the control unit 48 ends the temperature calculating processing.

As described above, the control unit 48 periodically calculates an electrical heating wire temperature, and updates the electrical heating wire temperature stored in the storage unit 47 to the calculated electrical heating wire temperature.

Power Supply Control Processing

Figure 5:
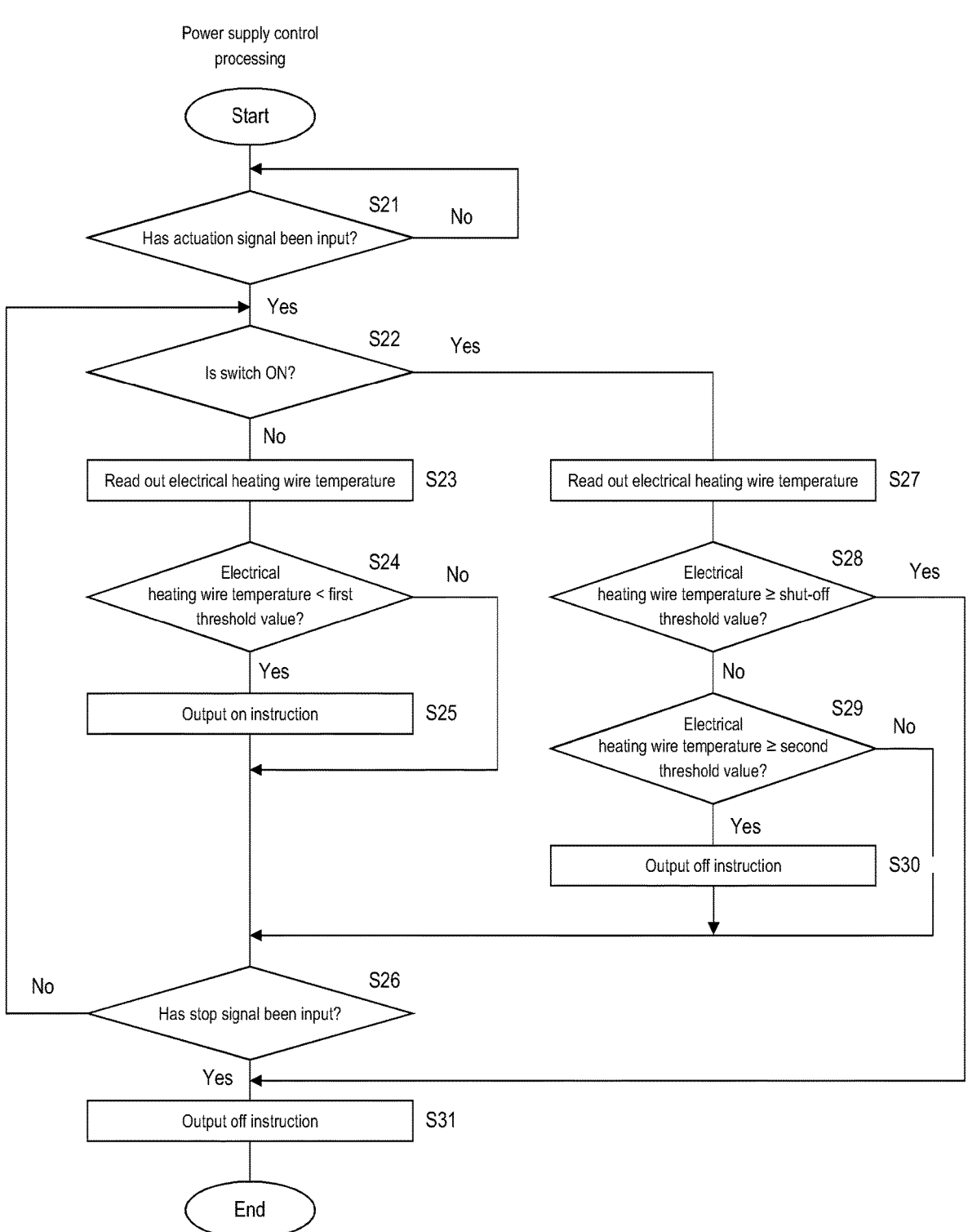
FIG. 5 is a flowchart showing a procedure of power supply control processing.

FIG. 5 is a flowchart showing the procedure of power supply control processing. The control unit 48 repeatedly executes the power supply control processing. The power supply control processing is executed in a state where the switch 20 is off. In the following description, it is assumed that the electrical heating wire current is smaller than the current threshold value. In this case, the drive circuit 23 switches the switch 20 on or off in accordance with an instruction output by the output unit 40.

In the power supply control processing, the control unit 48 determines whether or not an actuation signal has been input to the input unit 44 (step S21). If it is determined that an actuation signal has not been input (step S21: NO), the control unit 48 executes step S21 again, and waits until an actuation signal is input to the input unit 44.

If it is determined that an actuation signal has been input (step S21: YES), the control unit 48 determines whether or not the switch 20 is on (step S22). In step S22, if the most recent instruction output to the drive circuit 23 by the output unit 40 is an ON instruction, the control unit 48 determines that the switch 20 is on. If the most recent instruction output to the drive circuit 23 by the output unit 40 is an OFF instruction, the control unit 48 determines that the switch 20 is not on, or in other words, that the switch 20 is off. At the time point when the actuation signal is input, the switch 20 is off. Thus, in the power supply control processing, in step S22 that is executed first, the control unit 48 determines that the switch 20 is not on.

If it is determined that the switch 20 is not on (step S22: NO), the control unit 48 reads out the electrical heating wire temperature from the storage unit 47 (step S23), and determines whether or not the read electrical heating wire temperature is lower than the first threshold value (step S24). As described above, the first threshold value is a fixed value. In addition, the temperature calculating processing is periodically executed, and the electrical heating wire temperature stored in the storage unit 47 is periodically updated.

If it is determined that the electrical heating wire temperature is lower than the first threshold value (step S24: YES), the control unit 48 instructs the output unit 40 to output an ON instruction to the drive circuit 23 (step S25). Accordingly, the drive circuit 23 switches the switch 20 on. Accordingly, a current flows via the electrical heating wire 30, the electrical heating wire 30 generates heat, and the electrical heating wire temperature starts to increase.

If it is determined that the electrical heating wire temperature is higher than or equal to the first threshold value (step S24: NO), or after step S25 has been executed, the control unit 48 determines whether or not a stop signal has been input to the input unit 44 (step S26). If it is determined that a stop signal has not been input (step S26: NO), the control unit 48 executes step S22 again.

If it is determined that the switch 20 is on (step S22: YES), the control unit 48 reads out the electrical heating wire temperature from the storage unit 47 (step S27), and determines whether or not the read electrical heating wire temperature is higher than or equal to the shut-off threshold value (step S28). If it is determined that the electrical heating wire temperature is lower than the shut-off threshold value (step S28: NO), the control unit 48 determines whether or not the electrical heating wire temperature read in step S27 is higher than or equal to the second threshold value (step S29). As described above, the second threshold value exceeds the first threshold value, and the shut-off threshold value exceeds the second threshold value.

If it is determined that the electrical heating wire temperature is higher than or equal to the second threshold value (step S29: YES), the control unit 48 instructs the output unit 40 to output an OFF instruction to the drive circuit 23 (step S30). Accordingly, the drive circuit 23 switches the switch 20 off. As described above, the drive circuit 23 switches the switch 20 on or off in accordance with the electrical heating wire temperature calculated by the control unit 48.

If it is determined that the electrical heating wire temperature is lower than the second threshold value (step S29: NO), or after step S30 has been executed, the control unit 48 executes step S26.

If it is determined that a stop signal has been input (step S26: YES), or if it is determined that the electrical heating wire temperature is higher than or equal to the shut-off threshold value (step S28: YES), the control unit 48 instructs the output unit 40 to output an OFF instruction to the drive circuit 23 (step S31). Accordingly, the drive circuit 23 switches the switch 20 off. After executing step S31, the control unit 48 ends the power supply control processing.

As described above, when the electrical heating wire temperature reaches the shut-off threshold value or higher, the drive circuit 23 switches the switch 20 off. Therefore, a shut-off element for shutting off a flow of a current to the electrical heating wire 30 when the electrical heating wire temperature reaches an abnormal temperature, such as a thermostat, does not need to be disposed on the electrical heating wire 30.

If step S31 was executed after it was determined in step S26 that a stop signal had been input, the control unit 48 ends the power supply control processing, and then executes the power supply control processing again. When step S31 was executed after it was determined in step S28 that the electrical heating wire temperature was higher than or equal to the shut-off threshold value, the control unit 48 ends the power supply control processing, and does not execute the power supply control processing again thereafter. Therefore, when the electrical heating wire temperature increases to the shut-off threshold value or higher, the drive circuit 23 switches the switch 20 off, and keeps the switch 20 off.

Figure 6:
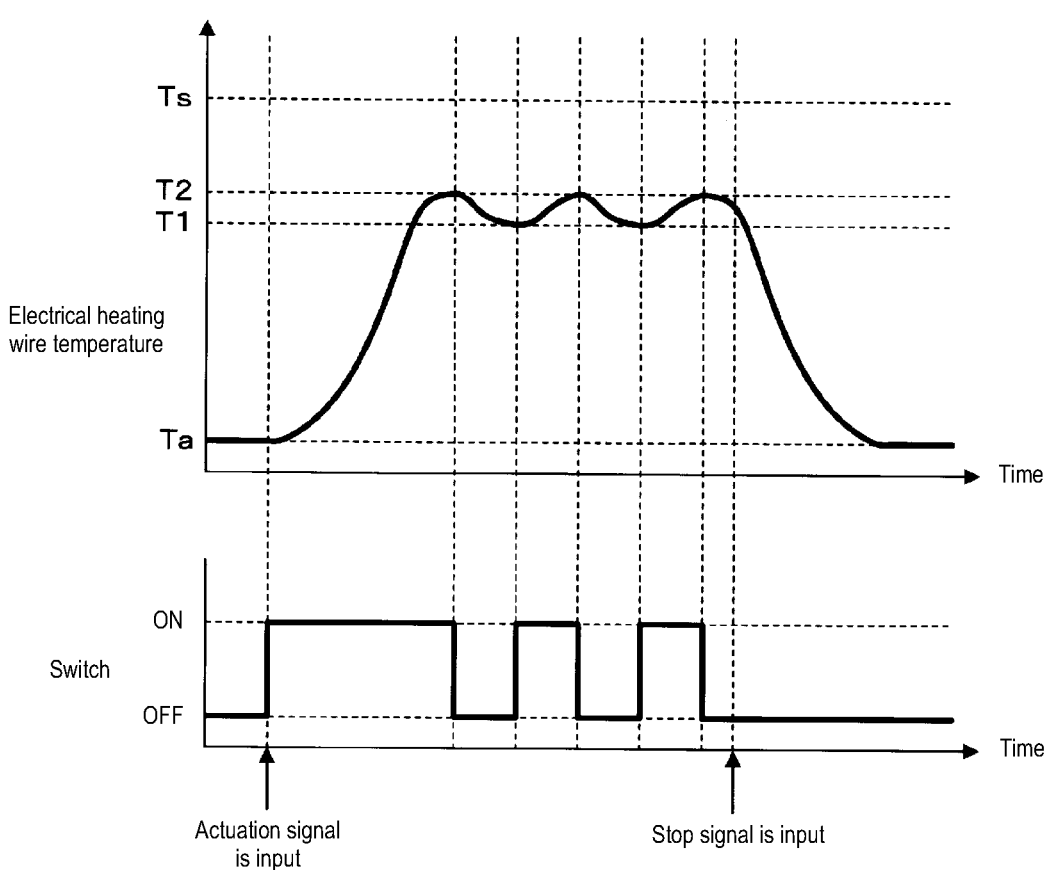
FIG. 6 is a diagram illustrating operations of a heater drive apparatus.

FIG. 6 is a diagram illustrating operations of the heater drive apparatus 11. FIG. 6 shows transition in the electrical heating wire temperature calculated by the control unit 48 and transition in the state of the switch 20. The horizontal axis indicates time with respect to transition in the electrical heating wire temperature and transition in the state of the switch 20. In FIG. 6, the first threshold value, the second threshold value, and the shut-off threshold value are respectively indicated by T1, T2, and Ts. As described above, the ambient temperature of the electrical heating wire 30 is indicated by Ta.

When an actuation signal is input to the input unit 44 in a state where the electrical heating wire temperature equals to the ambient temperature Ta of the electrical heating wire 30, the electrical heating wire temperature is lower than the first threshold value T1, and thus the output unit 40 outputs an ON instruction to the drive circuit 23, and the drive circuit 23 switches the switch 20 on. When the switch 20 is on, a current flows through the electrical heating wire 30, and the electrical heating wire temperature increases.

After the drive circuit 23 switches the switch 20 on, the drive circuit 23 keeps the switch 20 on until the electrical heating wire temperature calculated by the control unit 48 reaches the second threshold value T2 or higher. When the electrical heating wire temperature reaches the second threshold value T2 or higher, the output unit 40 outputs an OFF instruction to the drive circuit 23, and the drive circuit 23 switches the switch 20 off. Accordingly, a flow of a current via the electrical heating wire 30 stops, and the electrical heating wire temperature decreases.

After the drive circuit 23 switches the switch 20 off, the drive circuit 23 keeps the switch 20 off until the electrical heating wire temperature calculated by the control unit 48 decreases below the first threshold value T1. When the electrical heating wire temperature decreases below the first threshold value T1, the output unit 40 outputs an ON instruction to the drive circuit 23, and the drive circuit 23 switches the switch 20 on. As described above, until a stop signal is input to the input unit 44, the drive circuit 23 switches the switch 20 on when the electrical heating wire temperature decreases below the first threshold value and switches the switch 20 off when the electrical heating wire temperature reaches the second threshold value or higher. As a result, the electrical heating wire temperature is kept at a temperature that is higher than or equal to the first threshold value and lower than the second threshold value.

When a stop signal is input to the input unit 44, the output unit 40 outputs an OFF instruction to the drive circuit 23, and the drive circuit 23 switches the switch 20 off. As described above, when the switch 20 is off, the electrical heating wire temperature decreases.

Also when the electrical heating wire temperature reaches the shut-off threshold value or higher, the drive circuit 23 switches the switch 20 off, although FIG. 6 does not show such an operation. In this case, the drive circuit 23 keeps the switch 20 off.

As described above, in the heater drive apparatus 11, the control unit 48 of the microcomputer 24 calculates an electrical heating wire temperature based on an electrical heating wire current, and thus an element for detecting the temperature, such as a thermistor, does not need to be disposed in the vicinity of the electrical heating wire 30. In addition, the control unit 48 changes the thermal resistance value of the electrical heating wire 30 that is used in the formula for calculating an electrical heating wire temperature to the first setting value or the second setting value in accordance with seating information, or in other words, whether or not a person is seated on the seat. Thus, an accurate electrical heating wire temperature that is close to the actual electrical heating wire temperature is calculated. An electrical heating wire temperature is calculated based on not only an electrical heating wire current but also the ambient temperature of the electrical heating wire 30. Thus, a more accurate electrical heating wire temperature is calculated.

Second Embodiment

In the first embodiment, the drive circuit 23 switches the switch 20 on when the electrical heating wire temperature is lower than the first threshold value, and switches the switch 20 off when the electrical heating wire temperature is higher than or equal to the second threshold value. Accordingly, the electrical heating wire temperature is adjusted. In a second embodiment, the electrical heating wire temperature is adjusted by performing PWM (Pulse Width Modulation) control for repeatedly instructing to alternately switch the switch 20 on and off and adjusting the duty of PWM control.

The second embodiment will be described below with focus on differences from the first embodiment. Configurations other than configurations to be described later are in common with the first embodiment. Thus, constituent elements that are in common with the first embodiment are given the same reference numerals as the first embodiment, and a description thereof is omitted.

Configuration of Heater Drive Apparatus 11

Figure 7:
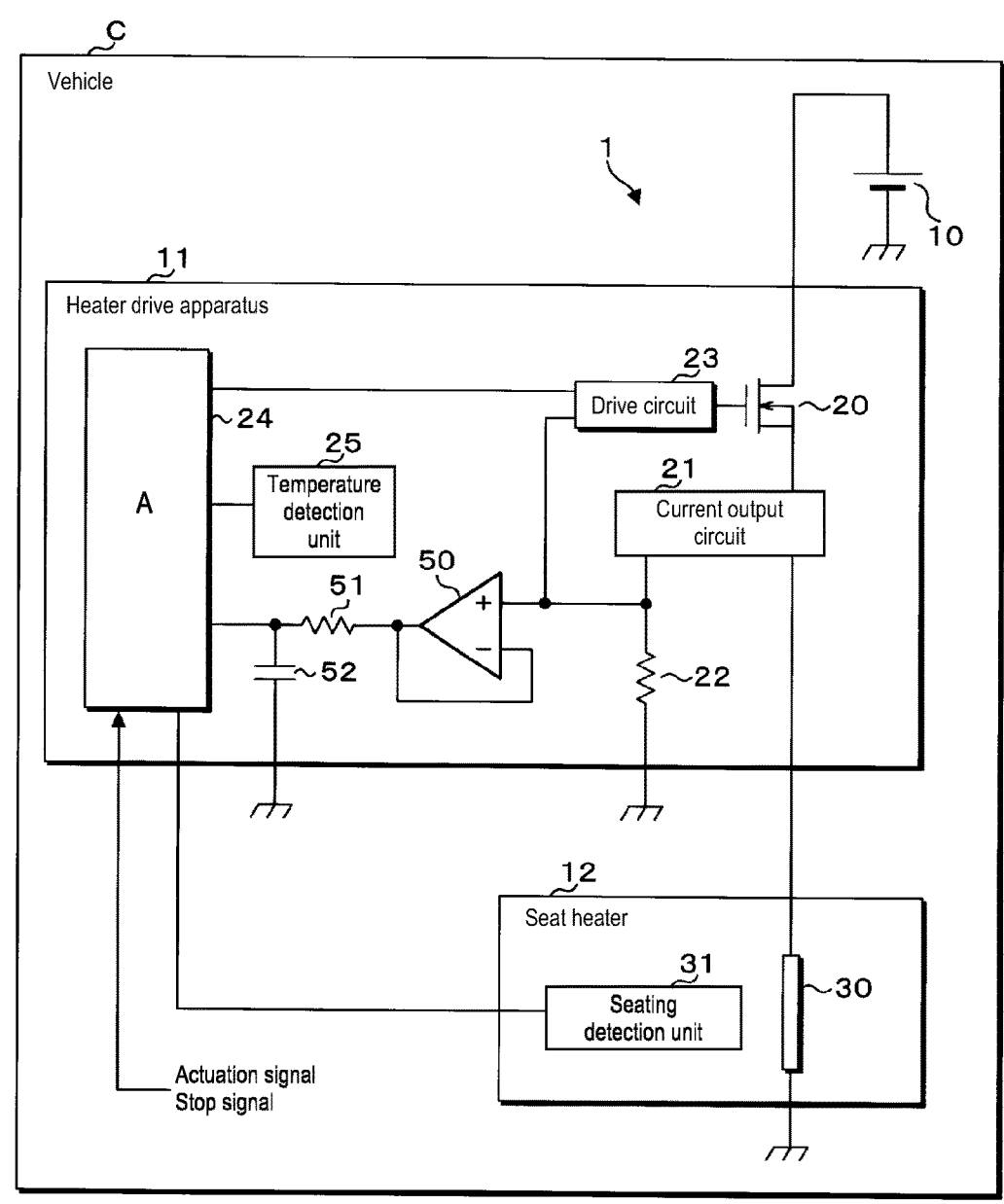
FIG. 7 is a block diagram showing the main configuration of a power source system according to a second embodiment.

FIG. 7 is a block diagram showing the main configuration of the power source system 1 according to the second embodiment. Comparing the power source system 1 according to the second embodiment with the power source system 1 according to the first embodiment, the configuration of the heater drive apparatus 11 is different. The heater drive apparatus 11 according to the second embodiment includes an operational amplifier 50, a smoothing resistor 51, and a smoothing capacitor 52, in addition to the constituent elements of the heater drive apparatus 11 according to the first embodiment. The operational amplifier 50 includes a positive end, a negative end, and an output end.

The connection node between the current output circuit 21 and the detection resistor 22 is connected to the drive circuit 23 similarly to the first embodiment, and is also connected to the positive end of the operational amplifier 50. The negative end of the operational amplifier 50 is connected to the output end of the operational amplifier 50. The output end of the operational amplifier 50 is also connected to one end of the smoothing resistor 51. The other end of the smoothing resistor 51 is connected to the microcomputer 24 and one end of the smoothing capacitor 52. The other end of the smoothing capacitor 52 is grounded.

The operational amplifier 50 functions as what is known as a voltage follower circuit. The operational amplifier 50 outputs, from the output end thereof, the end-to-end voltage of the detection resistor 22 input to the positive end thereof, without changing the voltage. An input impedance at the positive end of the operational amplifier 50 is very high, and thus the action of the circuit connected to the output end of the operational amplifier 50 does not affect the circuit connected to the positive end of the operational amplifier 50.

The smoothing resistor 51 and the smoothing capacitor 52 constitute a smoothing circuit. This smoothing circuit smooths the end-to-end voltage output from the output end of the operational amplifier 50. An analog smoothing voltage that is obtained by smoothing the end-to-end voltage of the detection resistor 22 is input to the microcomputer 24.

Configuration of Microcomputer 24

Figure 8:
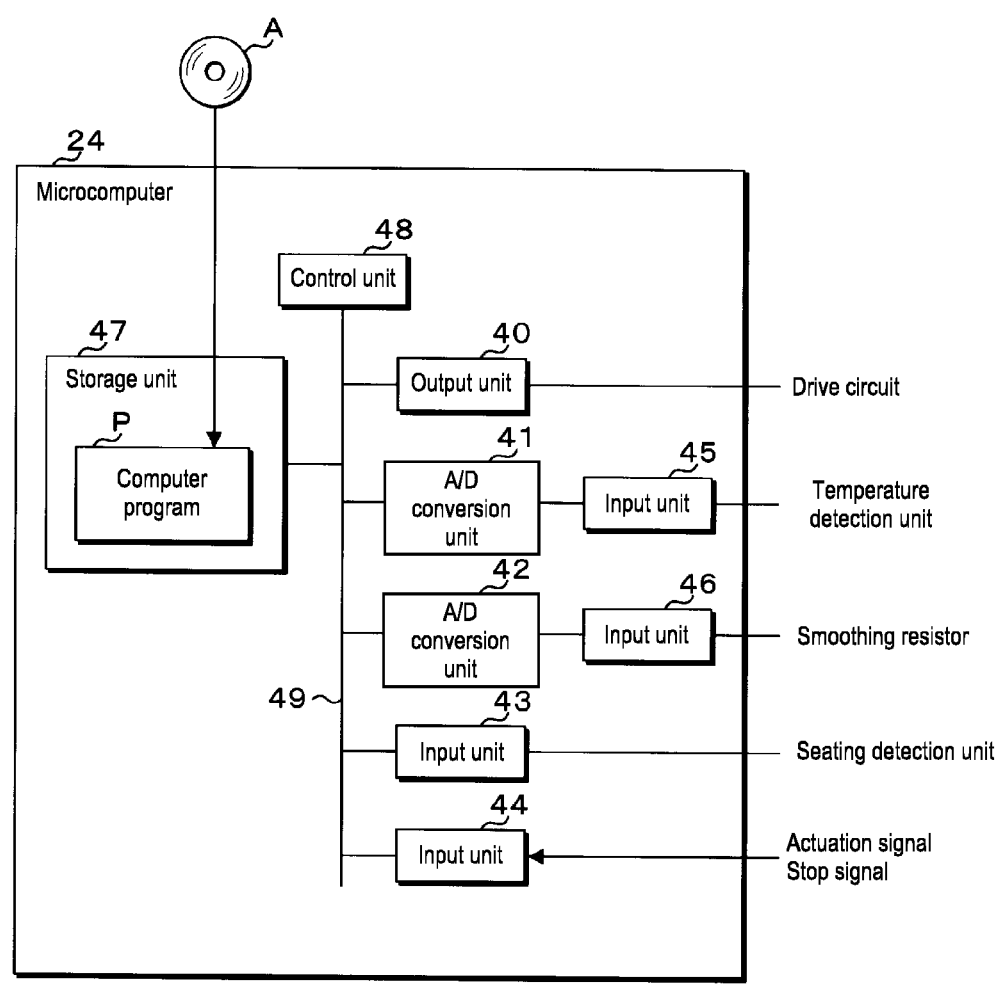
FIG. 8 is a block diagram showing the main configuration of a microcomputer.

FIG. 8 is a block diagram showing the main configuration of the microcomputer 24. The microcomputer 24 according to the second embodiment includes constituent elements of the microcomputer 24 according to the first embodiment. The input unit 46 is connected to the other end of the smoothing resistor 51.

Similarly to the first embodiment, the output unit 40 outputs an ON instruction and an OFF instruction to the drive circuit 23 in accordance with instructions given by the control unit 48. The control unit 48 further instructs the output unit 40 to execute PWM (Pulse Width Modulation) control for alternately repeating switching of the switch 20 on and switching of the switch 20 off.

When the output unit 40 is instructed to execute PWM control, the output unit 40 alternately outputs an ON instruction and an OFF instruction to the drive circuit 23. The output unit 40 periodically outputs an ON instruction or an OFF instruction. Similarly to the first embodiment, when an ON instruction is input to the drive circuit 23, the drive circuit 23 switches the switch 20 on. When an OFF instruction is input, the drive circuit 23 switches the switch 20 off.

Therefore, when the output unit 40 is instructed to execute PWM control, the drive circuit 23 executes PWM control for alternately repeating switching of the switch 20 on and switching of the switch 20 off. The output unit 40 periodically outputs an ON instruction or an OFF instruction, and thus the drive circuit 23 periodically switches the switch 20 on or off. The ratio of a period during which the switch 20 is on in one cycle is a duty. The duty is indicated by a value that exceeds zero and is smaller than one. The larger the duty is, the longer the period during which the switch 20 is on is in one cycle.

The duty is set in the output unit 40. The output unit 40 alternately outputs an ON instruction and an OFF instruction to the drive circuit 23 in accordance with the set duty. The duty set in the output unit 40 is changed by the control unit 48. The duty set in the output unit 40 is equivalent to the duty of PWM control.

An analog smoothing voltage is input from the other end of the smoothing resistor 51 to the input unit 46. When the analog smoothing voltage is input, the input unit 46 outputs the input analog smoothing voltage to the A/D conversion unit 42. The A/D conversion unit 42 converts the analog smoothing voltage input from the input unit 46 into a digital smoothing voltage. The control unit 48 obtains the digital smoothing voltage from the A/D conversion unit 42. At the time point when the smoothing voltage is obtained by the control unit 48, the smoothing voltage substantially matches a smoothing voltage output by the smoothing circuit constituted by the smoothing resistor 51 and the smoothing capacitor 52.

Calculation Formula for Heating Wire Temperature

The formula for calculating an electrical heating wire temperature that is used by the control unit 48 in the temperature calculating processing according to the second embodiment will be described below.

Figure 9:
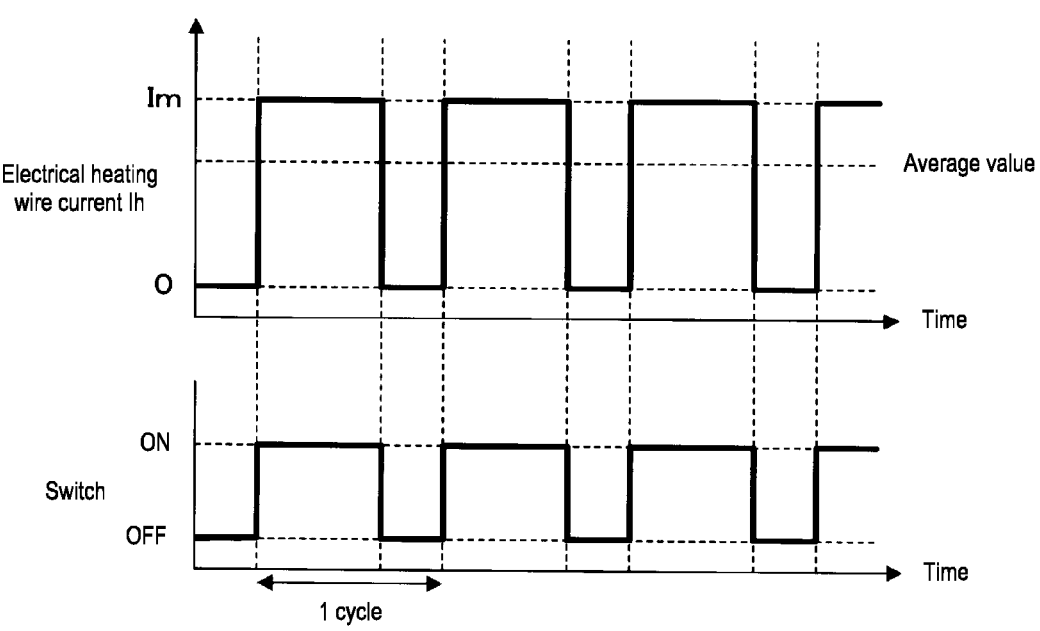
FIG. 9 is a graph showing transition in an electrical heating wire current and transition in the state of a switch.

FIG. 9 is a graph showing transition in the electrical heating wire current and transition in the state of the switch

20. The horizontal axis indicates time with respect to transition in the electrical heating wire current and transition in the state of the switch 20. When the drive circuit 23 is executing PWM control, the switch 20 is alternately switched on and switched off as shown on the lower side in FIG. 9. On the lower side in FIG. 9, an example is shown in which the switch 20 is periodically switched on. In this case, the duty is adjusted by adjusting a timing for switching the switch 20 off.

The switch 20 is alternately switched on and switched off, and thus the waveform of the electrical heating wire current Ih is pulsed as shown on the upper side in FIG. 9. Each pulse has a rectangular shape, and a current of each pulse is the same. Hereinafter, this current is referred to as a "pulse current", and is indicated by Im. In addition, the duty of PWM control and the smoothing voltage are respectively indicated by D and Vs.

$Ih^2$ in Formula 1 above is expressed as follows using the pulse current Im and the duty D.

$$Ih^2 = Im^2 D \tag{3}$$

The average value of the electrical heating wire current Ih is indicated by Im·D. The smoothing circuit constituted by the smoothing resistor 51 and the smoothing capacitor 52 smooths the end-to-end voltage of the detection resistor 22. Thus, the smoothing voltage Vs is proportional to the average value of the electrical heating wire current Ih. Thus, Formula 4 below holds.

$$Im \cdot D = \alpha \cdot Vs \tag{4}$$

Here, $\alpha$ is a constant.

If the pulse current Im is deleted from Formula 3 and Formula 4, Formula 5 below is derived.

$$Ih^2 = \alpha^2 Vs^2 / D \tag{5}$$

If the electrical heating wire current Ih is deleted from Formula 1 and Formula 5, Formula 6 below is derived.

$$\Delta Th = \Delta Tp \cdot \exp(-\Delta t / \tau r) + \alpha^2 \cdot Rth \cdot Rh \cdot Vs^2 \cdot (1 - \exp(-\Delta t / \tau r)) / D \tag{6}$$

In calculation of an electrical heating wire temperature according to the second embodiment, Formula 2 and Formula 6 are used. The unit for the smoothing voltage Vs is volt (V). The duty D is a ratio, and thus no unit is used for the duty D.

Note that, when the switch 20 is kept on, the temperature difference $\Delta Th$ is calculated using Formula 7 below that is obtained by substituting 1 for the duty D in Formula 6.

$$\Delta Th = \Delta Tp \cdot \exp(-\Delta t / \tau r) + \alpha^2 \cdot Rth \cdot Rh \cdot Vs^2 \cdot (1 - \exp(-\Delta t / \tau r)) \tag{7}$$

Furthermore, when the switch 20 is kept off, the smoothing voltage Vs is 0 V. Thus, the temperature difference $\Delta Th$ is calculated using Formula 8 below that is obtained by substituting 0 V for the smoothing voltage Vs in Formula 6.

$$\Delta Th = \Delta Tp \cdot \exp(-\Delta t / \tau r) \tag{8}$$

The control unit 48 calculates the temperature difference $\Delta Th$ using Formula 6 or 7 and Formula 2, or using Formula 8. The control unit 48 adds the ambient temperature Ta to the calculated temperature difference $\Delta Th$. Accordingly, an electrical heating wire temperature is calculated. Formulas 6, 7, and 8 are based on the smoothing voltage Vs. As described above, the smoothing voltage Vs is obtained by smoothing the end-to-end voltage of the detection resistor 22. Formulas 6, 7, and 8 are each based on the end-to-end voltage of the detection resistor 22, or in other words, an electrical heating wire current detected by the current output circuit 21 and the detection resistor 22. Calculation of an electrical heating wire temperature using Formula 6 or 7 and Formula 2 is equivalent to calculation of an electrical heating wire temperature that is based on an electrical heating wire current detected by the current output circuit 21 and the detection resistor 22. Calculation of an electrical heating wire temperature using Formula 8 is also equivalent to calculation of an electrical heating wire temperature that is based on an electrical heating wire current detected by the current output circuit 21 and the detection resistor 22.

Temperature Calculating Processing

Figure 10:
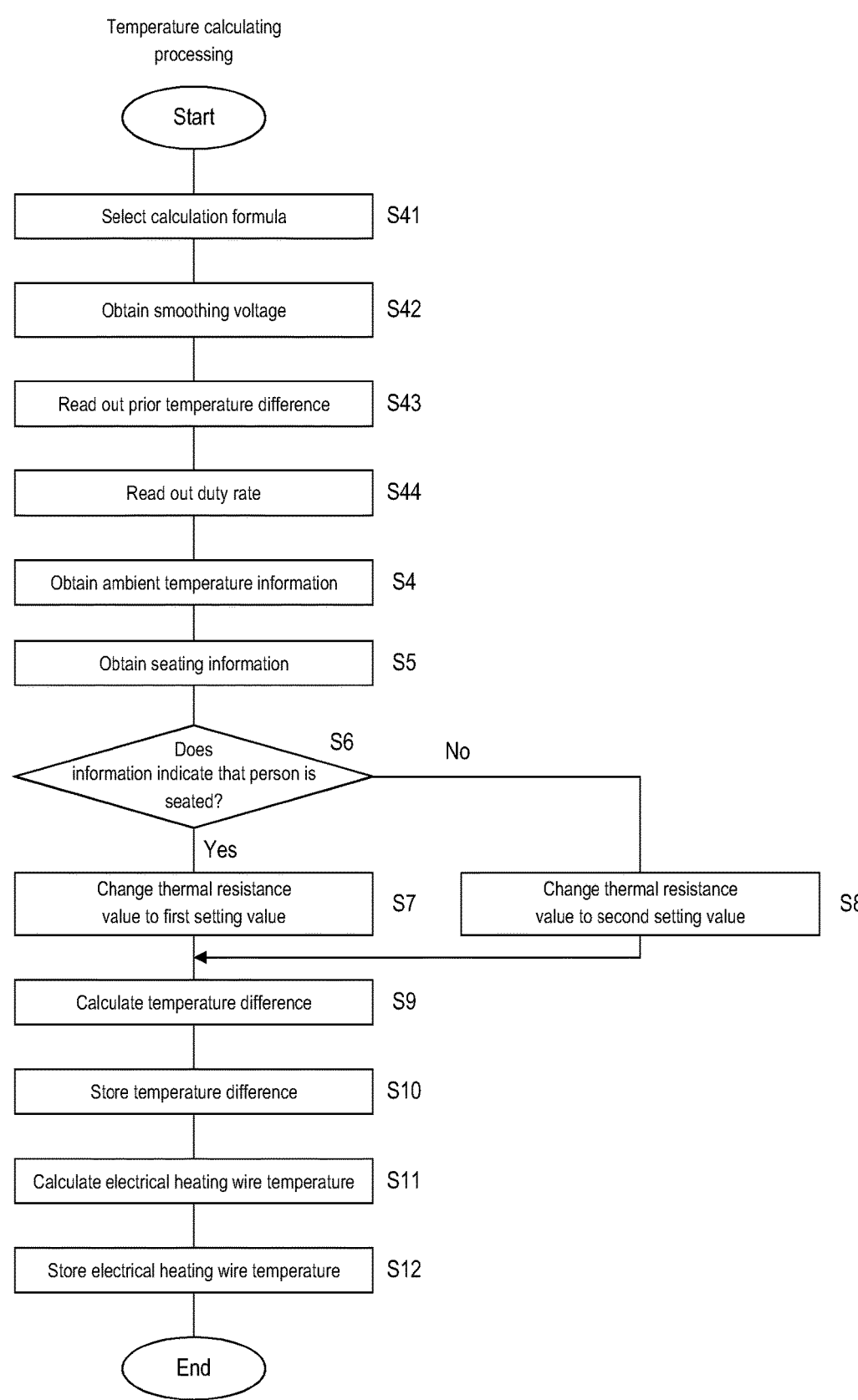
FIG. 10 is a flowchart showing the procedure of temperature calculating processing.

FIG. 10 is a flowchart showing the procedure of the temperature calculating processing. Similarly to the first embodiment, the control unit 48 periodically executes the temperature calculating processing while the microcomputer 24 is in operation. A portion of the temperature calculating processing according to the second embodiment is similar to a portion of the temperature calculating processing according to the first embodiment. Thus, a detailed description of the portion of the temperature calculating processing according to the second embodiment that is in common with the temperature calculating processing according to the first embodiment, or in other words, steps S4 to S12, is omitted.

In the temperature calculating processing, the control unit 48 selects a formula for calculating an electrical heating wire temperature from among Formulas 6 to 8, based on the most recent instruction notified to the output unit 40 (step S41). In step S41, if the most recent instruction notified to the output unit 40 by the control unit 48 is an instruction to execute PWM control, Formula 6 is selected. If the most recent instruction notified to the output unit 40 by the control unit 48 is an instruction to output an ON instruction, Formula 7 is selected. If the most recent instruction notified to the output unit 40 by the control unit 48 is an instruction to output an OFF instruction, Formula 8 is selected.

After executing step S41, the control unit 48 obtains a smoothing voltage from the A/D conversion unit 42 (step S42).

Note that, if the control unit 48 selects Formula 8 in step S1, execution of step S42 may be omitted.

Next, the control unit 48 reads out the prior temperature difference stored in the storage unit 47 (step S43), and reads out the duty from the output unit 40 (step S44). If execution of step S42 is omitted, the control unit 48 executes step S43 after executing step S41.

Note that, if the control unit 48 selects Formula 7 or 8 in step S41, execution of step S44 may be omitted.

After executing step S44, the control unit 48 executes step S4. If execution of step S44 is omitted, the control unit 48 executes step S4 after executing step 43.

If the control unit 48 selects Formula 8 in step S41, there is no need to use the thermal resistance value, and thus execution of steps S5 to S8 is omitted. In this case, after executing step S4, the control unit 48 executes step S9.

If the control unit 48 selects Formula 6 or 7 in step S41, the control unit 48 changes the thermal resistance value for the selected formula to the first setting value in step S7, and the control unit 48 changes the thermal resistance value for the selected formula to the second setting value in step S8.

If the control unit 48 selects Formula 6 in step S41, then, in step S9, the control unit 48 substitutes the smoothing voltage obtained in step S42, the prior temperature difference read out in step S43, the duty read out in step S44, and the ambient temperature of the electrical heating wire 30 indicated by the ambient temperature information obtained in step S4 in Formula 6 and Formula 2. Accordingly, the temperature difference is calculated.

If the control unit 48 selects Formula 7 in step S41, then, in step S9, the control unit 48 substitutes the smoothing voltage obtained in step S42, the prior temperature difference read out in step S43, and the ambient temperature of the electrical heating wire 30 indicated by the ambient temperature information obtained in step S4, in Formulas 7 and 2. Accordingly, the temperature difference is calculated.

If the control unit 48 selects Formula 8 in step S41, then, in step S9, the control unit 48 substitutes the prior temperature difference read out in step S43 in Formula 8. Accordingly, the temperature difference is calculated.

Power Supply Control Processing

Figure 11:
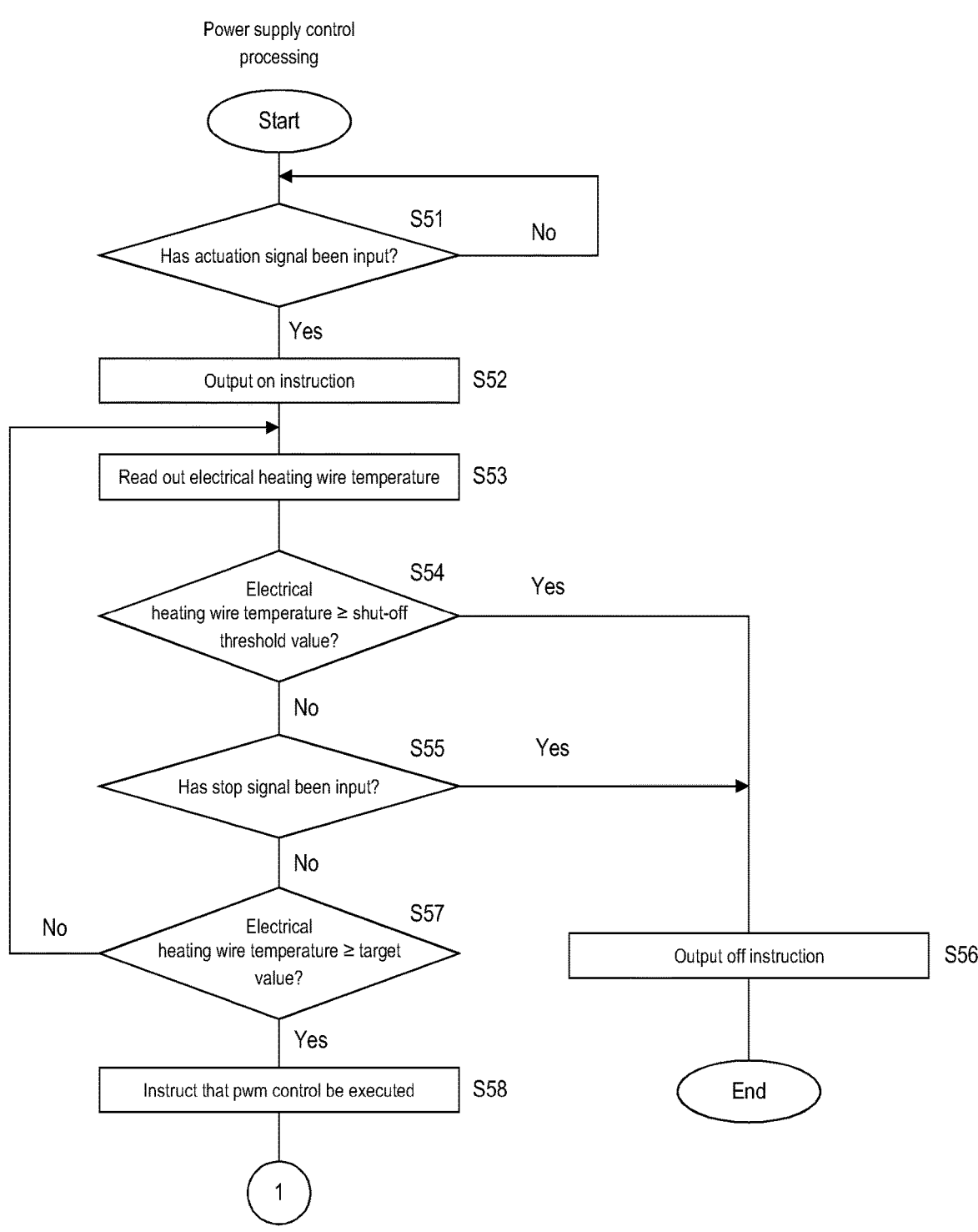
FIG. 11 is a flowchart showing the procedure of power supply control processing.
Figure 12:
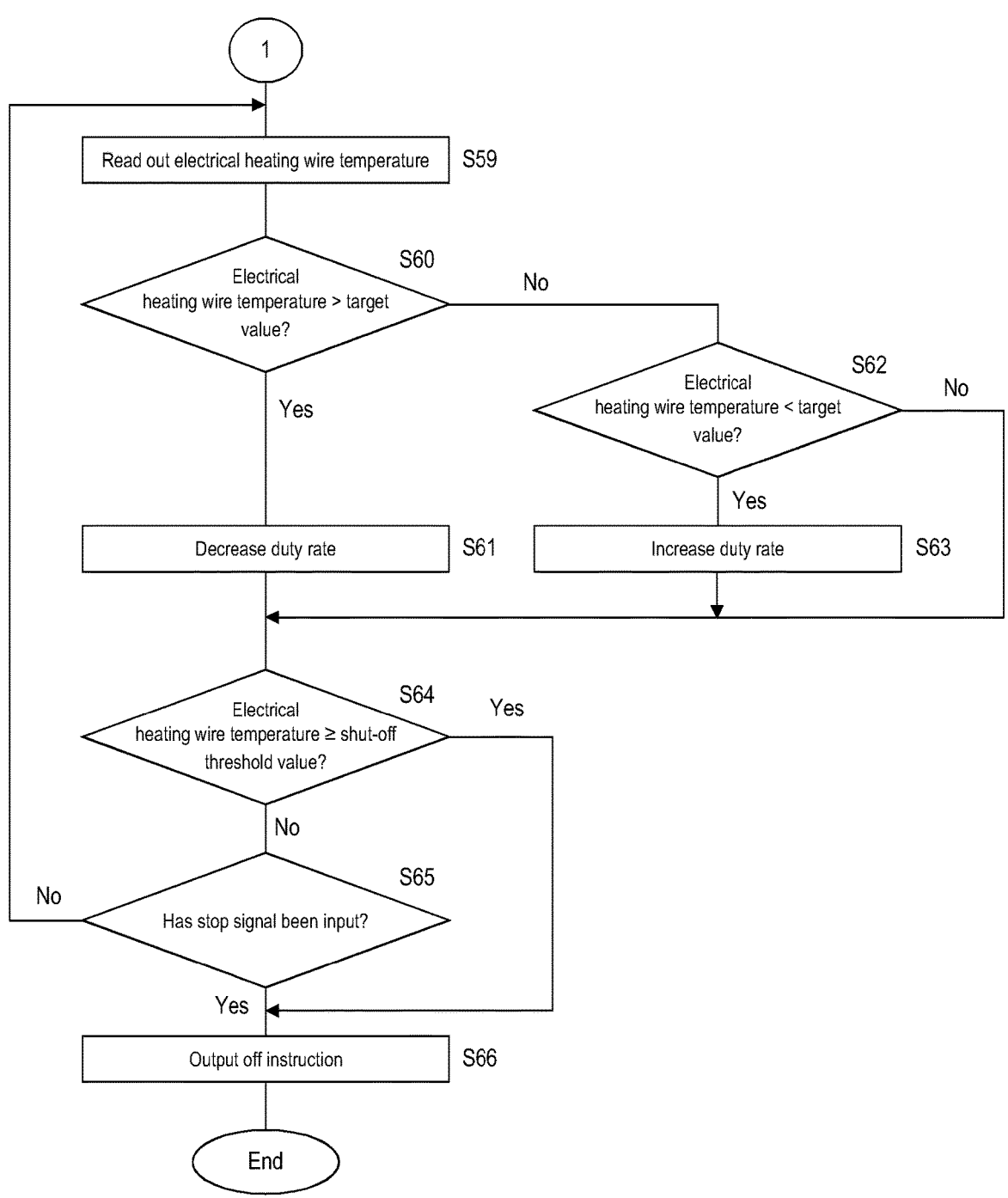
FIG. 12 is a flowchart showing the procedure of power supply control processing.

FIGS. 11 and 12 are flowcharts showing the procedure of the power supply control processing. The control unit 48 repeatedly executes the power supply control processing. The power supply control processing is executed in a state where the switch 20 is off. In the following description, it is assumed that the electrical heating wire current is smaller than the current threshold value. In this case, the drive circuit 23 switches the switch 20 on or off in accordance with an instruction output by the output unit 40.

In the power supply control processing, the control unit 48 determines whether or not an actuation signal has been input to the input unit 44 (step S51). If it is determined that an actuation signal has not been input (step S51: NO), the control unit 48 executes step S51 again, and waits until an actuation signal is input to the input unit 44.

If it is determined that an actuation signal has been input (step S51: YES), the control unit 48 instructs the output unit 40 to output an ON instruction to the drive circuit 23 (step S52). Accordingly, the drive circuit 23 switches the switch 20 on, and keeps the switch 20 on. As described in the first embodiment, when the switch 20 is on, a current flows via the electrical heating wire 30, and the electrical heating wire temperature increases.

After executing step S52, the control unit 48 reads out the electrical heating wire temperature from the storage unit 47 (step S53), and determines whether or not the read electrical heating wire temperature is higher than or equal to the shut-off threshold value (step S54). If it is determined that the electrical heating wire temperature is lower than the shut-off threshold value (step S54: NO), the control unit 48 determines whether or not a stop signal has been input to the input unit 44 (step S55). If it is determined that the electrical heating wire temperature is higher than or equal to the shut-off threshold value (step S54: YES), or if it is determined that a stop signal has been input (step S55: YES), the control unit 48 instructs the output unit 40 to output an OFF instruction to the drive circuit 23 (step S56).

Accordingly, the drive circuit 23 switches the switch 20 off, and keeps the switch 20 off. When the switch 20 is off, a current does not flow through the electrical heating wire 30, and thus the electrical heating wire temperature decreases. After executing step S56, the control unit 48 ends the power supply control processing.

If step S56 is executed after it is determined in step S54 that the electrical heating wire temperature is higher than or equal to the shut-off threshold value, the control unit 48 ends the power supply control processing, and does not execute the power supply control processing again thereafter. Therefore, after the electrical heating wire temperature reaches the shut-off threshold value or higher, the drive circuit 23 does not switch the switch 20 on. If step S56 is executed after it is determined in step S55 that a stop signal has been input, the control unit 48 ends the power supply control processing, and executes the power supply control processing again thereafter.

If it is determined that a stop signal has not been input (step S55: NO), the control unit 48 determines whether or not the electrical heating wire temperature read out in step S53 is higher than or equal to the target value (step S57). The target value is a fixed value that exceeds the ambient temperature of the electrical heating wire 30 and is lower than the shut-off threshold value, and is set in advance. If it is determined that the electrical heating wire temperature is lower than the target value (step S57: NO), the control unit 48 executes step S53 again. If the electrical heating wire temperature is lower than the shut-off threshold value, and a stop signal has not been input, the switch 20 is kept on until the electrical heating wire temperature reaches the target value or higher.

If it is determined that the electrical heating wire temperature is higher than or equal to the target value (step S57: YES), the control unit 48 instructs the output unit 40 to execute PWM control (step S58). Accordingly, the output unit 40 alternately outputs an ON instruction and an OFF instruction to the drive circuit 23 in accordance with the duty set in the output unit 40.

Next, the control unit 48 reads out the electrical heating wire temperature stored in the storage unit 47 (step S59), and determines whether or not the read electrical heating wire temperature exceeds the target value (step S60). If it is determined that the electrical heating wire temperature exceeds the target value (step S60: YES), the control unit 48 decreases the duty set in the output unit 40 by a fixed value (step S61). Here, the fixed value is a preset value. Accordingly, the duty of PWM control that is performed by the drive circuit 23 decreases by the fixed value, and the electrical heating wire temperature decreases.

If it is determined that the electrical heating wire temperature does not exceed the target value (step S60: NO), the control unit 48 determines whether or not the electrical heating wire temperature read out in step S59 is lower than the target value (step S62). If it is determined that the electrical heating wire temperature is lower than the target value (step S62: YES), the control unit 48 increases the duty set in the output unit 40 by a fixed value (step S63). Here, the fixed value is a preset value. Accordingly, the duty of PWM control that is performed by the drive circuit 23 increases by the fixed value, and the electrical heating wire temperature increases.

After executing step S61 or S63, or if it is determined that the electrical heating wire temperature is not lower than the target value (step S62: NO), the control unit 48 determines whether or not the electrical heating wire temperature read out in step S59 is higher than or equal to the shut-off threshold value (step S64). If it is determined that the electrical heating wire temperature is lower than the shut-off threshold value (step S64: NO), the control unit 48 determines whether or not a stop signal has been input to the input unit 44 (step S65). If it is determined that a stop signal has not been input (step S65: NO), the control unit 48 executes step S59 again. The duty is adjusted such that the electrical heating wire temperature achieves the target value, until the electrical heating wire temperature reaches the shut-off threshold value or higher or a stop signal is input.

If it is determined that the electrical heating wire temperature is higher than or equal to the shut-off threshold value (step S64: YES), or if it is determined that a stop signal has been input (step S65: YES), the control unit 48 instructs the output unit 40 to output an OFF instruction to the drive circuit 23 (step S66). Accordingly, the drive circuit 23 switches the switch 20 off, and keeps the switch 20 off. When the switch 20 is off, a current does not flow through the electrical heating wire 30, and thus the electrical heating wire temperature decreases. After executing step S66, the control unit 48 ends the power supply control processing.

If step S66 is executed after it is determined in step S64 that the electrical heating wire temperature is higher than or equal to the shut-off threshold value, the control unit 48 ends the power supply control processing, and does not execute the power supply control processing again thereafter. Therefore, after the electrical heating wire temperature reaches the shut-off threshold value or higher, the drive circuit 23 does not switch the switch 20 on. If step S66 is executed after it is determined in step S65 that a stop signal has been input, the control unit 48 ends the power supply control processing, and executes the power supply control processing again thereafter.

Figure 13:
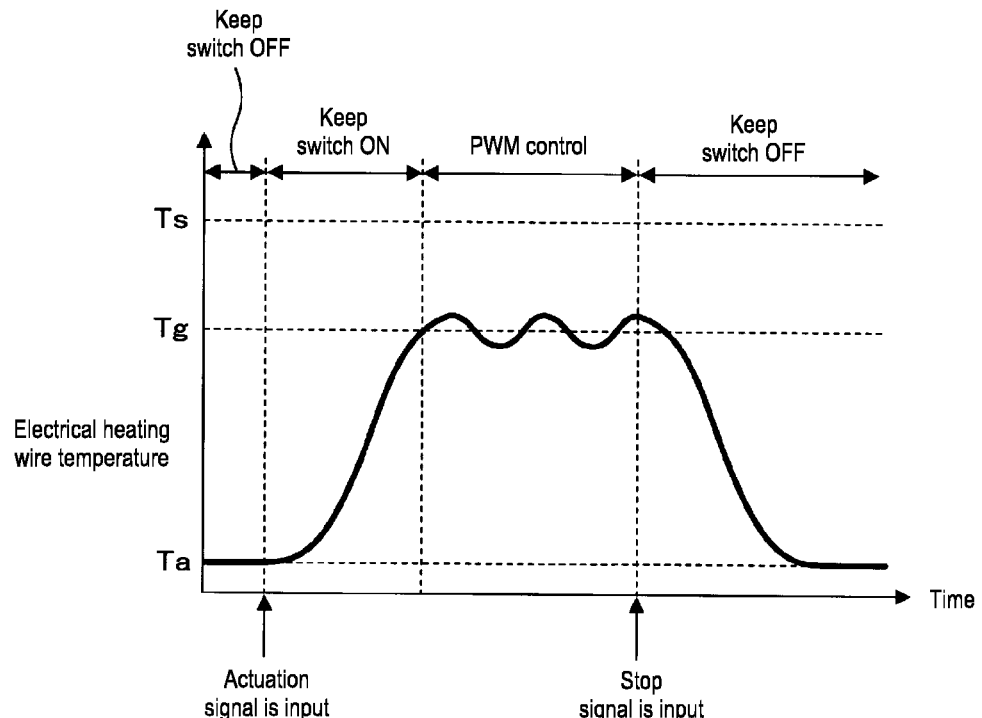
FIG. 13 is a graph showing transition in an electrical heating wire temperature.

FIG. 13 is a graph showing transition in the electrical heating wire temperature. FIG. 13 shows transition in the electrical heating wire temperature calculated by the control unit 48. The horizontal axis indicates time. In FIG. 13, similarly to FIG. 6, the ambient temperature of the electrical heating wire 30 and the shut-off threshold value are respectively indicated by Ta and Ts. Furthermore, the target value is indicated by Tg.

When an actuation signal is input to the input unit 44 in a state where the electrical heating wire temperature is the same as the ambient temperature Ta of the electrical heating wire 30, or in other words, when power supply to the electrical heating wire 30 is started, the output unit 40 outputs an ON instruction. Accordingly, the drive circuit 23 switches the switch 20 on. When the switch 20 is on, a current flows through the electrical heating wire 30, and the electrical heating wire temperature increases. The drive circuit 23 keeps the switch 20 on until the electrical heating wire temperature calculated by the control unit 48 reaches the target value Tg or higher. Accordingly, the electrical heating wire temperature rapidly increases to the target value Tg.

When the electrical heating wire temperature calculated by the control unit 48 reaches the target value Tg or higher, the control unit 48 instructs the output unit 40 to execute PWM control, and the drive circuit 23 executes PWM control. When the electrical heating wire temperature exceeds the target value Tg, the control unit 48 decreases the duty of PWM control. Accordingly, the electrical heating wire temperature decreases and approaches the target value Tg. When the electrical heating wire temperature is lower than the target value Tg, the control unit 48 increases the duty of PWM control. Accordingly, the electrical heating wire temperature increases and approaches the target value Tg. As described above, after the electrical heating wire temperature reaches the target value Tg or higher, PWM control is executed, and the duty is changed such that the electrical heating wire temperature reaches the target value Tg.

When a stop signal is input to the input unit 44, the output unit 40 outputs an OFF instruction. Accordingly, the drive circuit 23 switches the switch 20 off, and keeps the switch 20 off. When the switch 20 is off, a current does not flow through the electrical heating wire 30, and thus the electrical heating wire temperature decreases.

In the heater drive apparatus 11 according to the second embodiment, similarly to the first embodiment, an element for detecting the temperature, such as a thermistor, does not need to be disposed in the vicinity of the electrical heating wire 30. In addition, the control unit 48 changes the thermal resistance value of the electrical heating wire 30 that is used for the formula for calculating an electrical heating wire temperature to the first setting value or the second setting value in accordance with seating information, and thus an accurate electrical heating wire temperature that is close to the actual electrical heating wire temperature is calculated. The electrical heating wire temperature is calculated based on not only the electrical heating wire current but also the ambient temperature of the electrical heating wire 30. Thus, a more accurate electrical heating wire temperature is calculated.

Third Embodiment

In the second embodiment, a setting value of an electrical heating wire temperature that is set as a condition for transition from keeping the switch 20 on to PWM control is a target value, and is the same as a setting value of an electrical heating wire temperature related to adjustment of the duty of PWM control. However, these setting values may be different.

A third embodiment will be described below with focus on differences from the second embodiment. Configurations other than configurations to be described later are in common with the second embodiment. Thus, constituent elements that are in common with the second embodiment are given the same reference numerals as the second embodiment, and a description thereof is omitted.

Power Supply Control Processing

Figure 14:
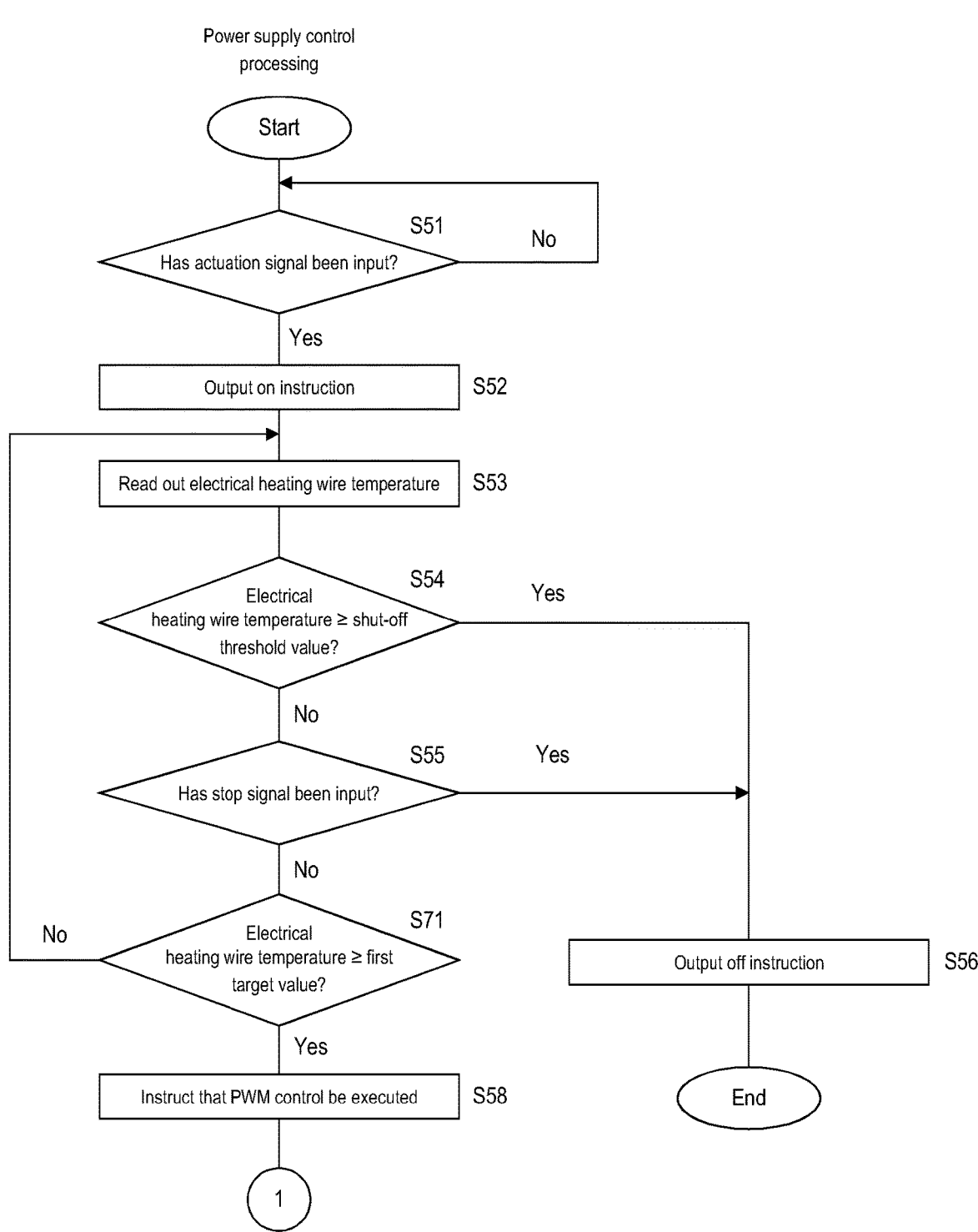
FIG. 14 is a flowchart showing the procedure of power supply control processing according to a third embodiment.
Figure 15:
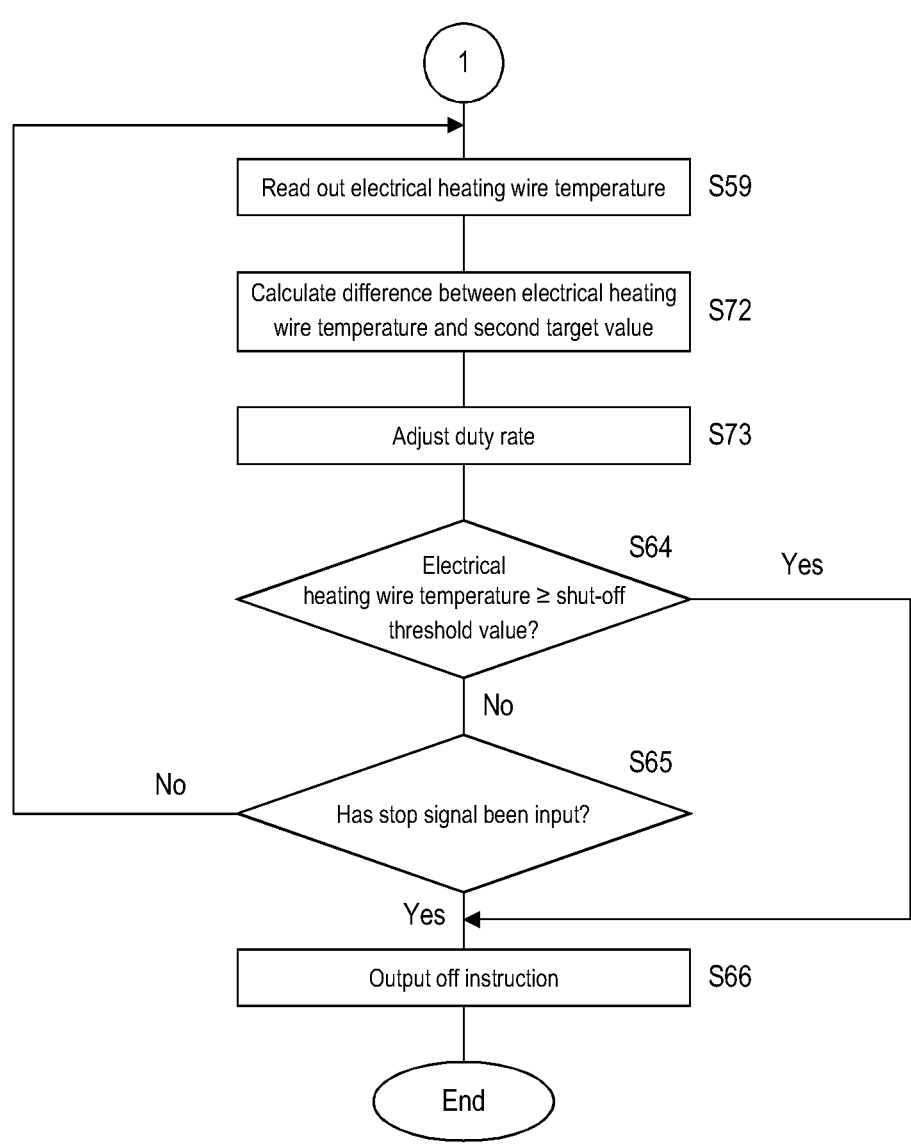
FIG. 15 is a flowchart showing the procedure of power supply control processing according to the third embodiment.

FIGS. 14 and 15 are flowcharts showing the procedure of power supply control processing according to the third embodiment. The control unit 48 repeatedly executes the first power supply control processing. The power supply control processing is executed in a state where the switch 20 is off. In the following description, it is assumed that the electrical heating wire current is lower than the current threshold value. In this case, the drive circuit 23 switches the switch 20 on or off in accordance with an instruction output by the output unit 40.

A portion of the power supply control processing according to the third embodiment is similar to a portion of the power supply control processing according to the second embodiment. A detailed description of the portion of the power supply control processing according to the third embodiment that is similar to the power supply control processing according to the second embodiment, or in other words, steps S51 to S56, S58, S59, and S64 to S66, is omitted.

In the third embodiment, in place of a target value, a first target value and a second target value are set in advance. The first target value and the second target value are fixed values that exceed the ambient temperature of the electrical heating wire 30. The second target value exceeds the first target value. A shut-off threshold value exceeds the second target value.

In the power supply control processing, if it is determined that a stop signal has not been input (step S55: NO), the control unit 48 determines whether or not the electrical heating wire temperature read out in step S53 is higher than or equal to the first target value (step S71). If it is determined that the electrical heating wire temperature is lower than the first target value (step S71: NO), the control unit 48 executes step S53 again. When the electrical heating wire temperature is lower than the shut-off threshold value, and a stop signal has not been input, the switch 20 is kept on until the electrical heating wire temperature reaches the first target value or higher.

If it is determined that the electrical heating wire temperature is higher than or equal to the first target value (step S71: YES), the control unit 48 sequentially executes steps S58 and S59. After executing step S59, the control unit 48 calculates the difference between the electrical heating wire temperature and the second target value obtained by subtracting the second target value from the electrical heating wire temperature read out in step S59 (step S72). Therefore, if the electrical heating wire temperature exceeds the second target value, the difference is positive. If the electrical heating wire temperature is lower than the second target value, the difference is negative.

Next, the control unit 48 adjusts the duty set in the output unit 40 based on the difference calculated in step S72 (step S73). If the difference is positive, the control unit 48 decreases the duty. The larger the absolute value of the difference, the larger the degree by which the control unit 48 decreases the duty. If the difference is negative, the control unit 48 increases the duty. The larger the absolute value of the difference, the larger the degree by which the control unit 48 increases the duty. Accordingly, the electrical heating wire temperature approaches the second target value.

After executing step S73, the control unit 48 executes step S64.

Figure 16:
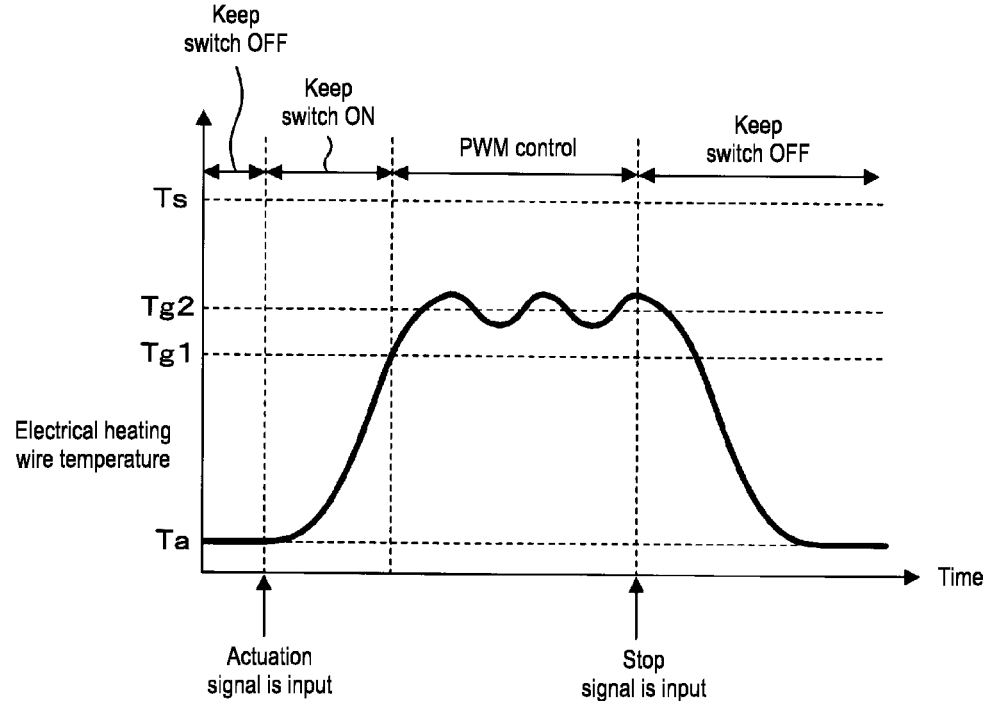
FIG. 16 is a graph showing transition in an electrical heating wire temperature.

FIG. 16 is a graph showing transition in the electrical heating wire temperature. FIG. 16 shows transition in the electrical heating wire temperature calculated by the control unit 48. The horizontal axis indicates time. In FIG. 16, similarly to FIG. 13, the ambient temperature of the electrical heating wire 30 and the shut-off threshold value are respectively indicated by Ta and Ts. Furthermore, the first target value and the second target value are respectively indicated by Tg1 and Tg2.

When an actuation signal is input to the input unit 44 in a state where the electrical heating wire temperature is the same as the ambient temperature Ta of the electrical heating wire 30, or in other words, when power supply to the electrical heating wire 30 is started, the output unit 40 outputs an ON instruction. Accordingly, the drive circuit 23 switches the switch 20 on. When the switch 20 is on, a current flows via the electrical heating wire 30, and the electrical heating wire temperature increases. The drive circuit 23 keeps the switch 20 on until the electrical heating wire temperature calculated by the control unit 48 reaches the first target value Tg1 or higher. Accordingly, the electrical heating wire temperature rapidly increases to the first target value Tg1.

When the electrical heating wire temperature calculated by the control unit 48 reaches the first target value Tg1 or higher, the control unit 48 instructs the output unit 40 to execute PWM control, and the drive circuit 23 executes PWM control. When the electrical heating wire temperature is lower than the second target value Tg2, the control unit 48 increase the duty of PWM control. Accordingly, the electrical heating wire temperature increases, and approaches the second target value Tg2. The larger the absolute value of the difference between the electrical heating wire temperature and the second target value Tg2, the larger the degree by which the control unit 48 increases the duty. Thus, the electrical heating wire temperature reaches the second target value Tg2 in a short period.

When the electrical heating wire temperature exceeds the second target value Tg2, the control unit 48 decreases the duty of PWM control. Accordingly, the electrical heating wire temperature decreases, and approaches the second target value Tg2. The larger the absolute value of the difference between the electrical heating wire temperature and the second target value Tg2, the larger the degree by which the control unit 48 decreases the duty. Thus, the electrical heating wire temperature reaches the second target value Tg2 in a short period.

In this manner, after the electrical heating wire temperature reaches the first target value Tg1 or higher, PWM control is executed, and the duty is adjusted based on the difference between the electrical heating wire temperature and the second target value Tg2.

When a stop signal is input to the input unit 44, the output unit 40 outputs an OFF instruction. Accordingly, the drive circuit 23 switches the switch 20 off, and keeps the switch 20 off. When the switch 20 is off, a current does not flow through the electrical heating wire 30, and thus the electrical heating wire temperature decreases.

Similarly to the first embodiment, in the heater drive apparatus 11 according to the third embodiment, an element for detecting the temperature, such as a thermistor, does not need to be disposed in the vicinity of the electrical heating wire 30. In addition, the control unit 48 changes the thermal resistance value of the electrical heating wire 30 that is used in the formula for calculating an electrical heating wire temperature to the first setting value or the second setting value in accordance with seating information, and thus an accurate electrical heating wire temperature that is close to the actual electrical heating wire temperature is calculated. An electrical heating wire temperature is calculated based on not only the electrical heating wire current but also the ambient temperature of the electrical heating wire 30. Thus, a more accurate electrical heating wire temperature is calculated.

Note that, in the power supply control processing according to the third embodiment, similarly to the second embodiment, the control unit 48 may change the duty of PWM control. Therefore, when the electrical heating wire temperature is lower than the second target value Tg2, the control unit 48 increases the duty by a fixed value. When the electrical heating wire temperature exceeds the second target value Tg2, the control unit 48 decreases the duty by a fixed value.

In addition, in the power supply control processing according to the second embodiment, similarly to the third embodiment, the control unit 48 may adjust the degree by which the duty is increased or the degree by which the duty is decreased, based on the absolute value of a difference that is obtained by subtracting the target value from the electrical heating wire temperature.

Fourth Embodiment

In the first embodiment, while the microcomputer 24 is in operation, the control unit 48 periodically executes the temperature calculating processing and calculates an electrical heating wire temperature. However, while the microcomputer 24 is in operation, the control unit 48 may suspend calculation of an electrical heating wire temperature.

A fourth embodiment will be described below with focus on differences from the first embodiment. Configurations other than configurations to be described later are in common with the first embodiment. Thus, constituent elements that are in common with the first embodiment are given the same reference numerals as the first embodiment, and a description thereof is omitted.

Configuration of Microcomputer 24

In the fourth embodiment, a processing element of the control unit 48 executes second temperature calculating processing for calculating an electrical heating wire temperature by executing a computer program P. In the second temperature calculating processing, the control unit 48 executes temperature calculating processing. The control unit 48 executes the second temperature calculating processing and power supply control processing in parallel in a time shared manner.

Second Temperature Calculating Processing

Figure 17:
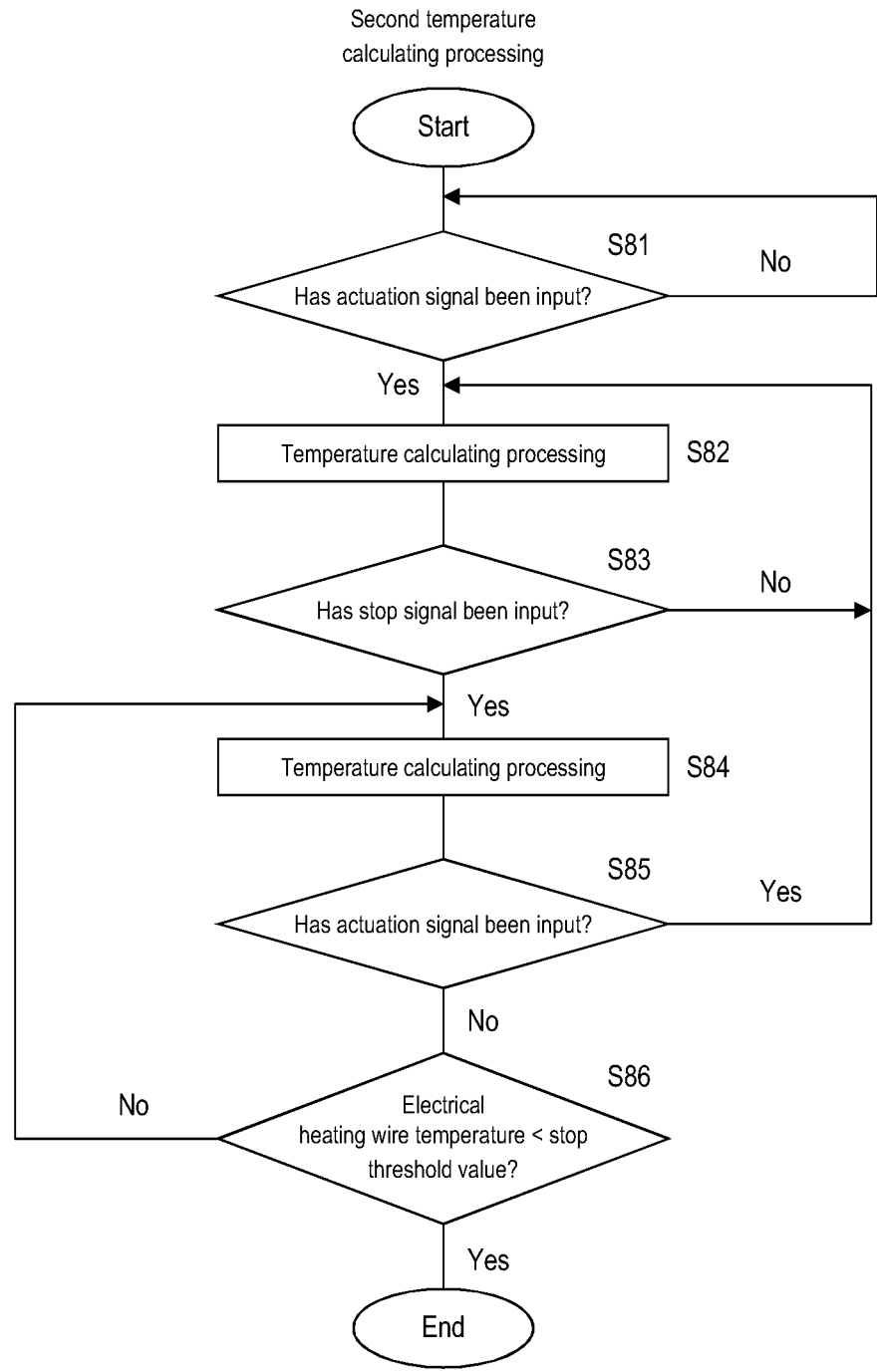
FIG. 17 is a flowchart showing the procedure of second temperature calculating processing according to a fourth embodiment.

FIG. 17 is a flowchart showing the procedure of the second temperature calculating processing according to the fourth embodiment. The control unit 48 repeatedly executes the second temperature calculating processing. In the second temperature calculating processing, the control unit 48 determines whether or not an actuation signal has been input to the input unit 44 (step S81). If it is determined that an actuation signal has not been input (step S81: NO), the control unit 48 executes step S81 again, and waits until an actuation signal is input to the input unit 44.

If it is determined that an actuation signal has been input (step S81: YES), the control unit 48 executes temperature calculating processing (step S82). Accordingly, an electrical heating wire temperature is calculated, and the electrical heating wire temperature stored in the storage unit 47 is updated to the calculated electrical heating wire temperature. After executing step S82, the control unit 48 determines whether or not a stop signal has been input to the input unit 44 (step S83). If it is determined that a stop signal has not been input (step S83: NO), the control unit 48 executes step S82 again. The control unit 48 periodically executes step S82 and calculates an electrical heating wire temperature until a stop signal is input.

If it is determined that a stop signal has been input (step S83: YES), the control unit 48 executes the temperature calculating processing (step S84), and determines whether or not an actuation signal has been input to the input unit 44 (step S85). If it is determined that an actuation signal has been input (step S85: YES), the control unit 48 executes step S82 again, and periodically calculates an electrical heating wire temperature until a stop signal is input.

If it is determined that an actuation signal has not been input (step S85: NO), the control unit 48 determines whether or not the electrical heating wire temperature stored in the storage unit 47, or in other words, the electrical heating wire temperature calculated in the temperature calculating processing in step S84 by the control unit 48, is lower than a stop threshold value (step S86). The stop threshold value is a fixed value that exceeds the ambient temperature of the electrical heating wire 30 and is lower than the first threshold value, and is set in advance. The stop threshold value is preferably a value that is close to the ambient temperature of the electrical heating wire 30.

If it is determined that the electrical heating wire temperature is higher than or equal to the stop threshold value (step S86: NO), the control unit 48 executes step S84, and calculates an electrical heating wire temperature again. If an actuation signal is not input, the control unit 48 periodically executes the temperature calculating processing and calculates an electrical heating wire temperature until the electrical heating wire temperature decreases below the stop threshold value. In the power supply control processing, when a stop signal is input to the input unit 44, the output unit 40 is instructed to output an OFF instruction to the drive circuit 23, and the drive circuit 23 switches the switch 20 off. The drive circuit 23 then keeps the switch 20 off until an actuation signal is input to the input unit 44. Therefore, from when a stop signal is input, until when an actuation signal is input, the electrical heating wire temperature decreases with the lapse of time.

If it is determined that the electrical heating wire temperature is lower than the stop threshold value (step S86: YES), the control unit 48 ends the second temperature calculating processing. The control unit 48 then executes step S81 again.

As described above, in the heater drive apparatus 11 according to the fourth embodiment, when an electrical heating wire temperature calculated by the control unit 48 decreases below the stop threshold value, the control unit 48 suspends calculation of an electrical heating wire temperature until an actuation signal is input to the input unit 44. Thus, electric power that is consumed in the microcomputer 24 is small.

The heater drive apparatus 11 according to the fourth embodiment achieves effects that are achieved by the heater drive apparatus 11 according to the first embodiment in a similar manner.

Note that the control unit 48 of the microcomputer 24 of the heater drive apparatus 11 according to each of the second and third embodiments may execute the second temperature calculating processing and the power supply control processing in parallel, similarly to the fourth embodiment. In the second temperature calculating processing according to the second and third embodiments, the temperature calculating processing according to the second and third embodiments is executed. In the second embodiment, the stop threshold value is a fixed value that exceeds the ambient temperature of the electrical heating wire 30 and is lower than the target value. In the third embodiment, the stop threshold value is a fixed value that exceeds the ambient temperature of the electrical heating wire 30 and is lower than the first target value.

In addition, in the first to fourth embodiments, an electrical device that is driven by the heater drive apparatus 11 may be any electrical device that includes the electrical heating wire 30, and thus there is no limitation to the seat heater 12, and the electrical device may be a defogger, for example. In this case, a thermal resistance value that is used for calculating an electrical heating wire temperature is a constant, and is a preset fixed value.

Furthermore, in the first to fourth embodiments, the switch 20 of the heater drive apparatus 11 is not limited to an N-channel FET, and may be a P-channel FET, a bipolar transistor, a relay contact, or the like.

In addition, in the first to fourth embodiments, the configuration for detecting an electrical heating wire current is not limited to a configuration in which the current output circuit 21 and the detection resistor 22 are used. The configuration for detecting an electrical heating wire current may also be a configuration for detecting an electrical heating wire current based on a voltage between the two ends of a shunt resistor connected in series to the switch 20, or a configuration for detecting an electrical heating wire current based on the intensity of a magnetic field that is generated in the surroundings of a connection line that connects the switch 20 and the current output circuit 21.

Furthermore, in the temperature calculating processing according to the first to fourth embodiments, a prior temperature difference for calculating an electrical heating wire temperature may be any temperature difference calculated previously, and thus there is no limitation to the temperature difference calculated in the last temperature calculating processing, and the prior temperature difference may also be the temperature difference calculated in the last but one temperature calculating processing, for example.

The first to fourth embodiments that have been disclosed are to be considered as illustrative and non-limiting in all aspects. The scope of the present disclosure is indicated not by the above-stated meanings but by the claims, and all changes that come within the meaning and range of equivalency of the claims are intended to be embraced therein.

The invention claimed is:

1. A power supply control apparatus for controlling power supply to an electrical heating wire, the apparatus comprising:

a current detection unit configured to detect a current flowing through the electrical heating wire;

a switch that is disposed on a path of the current that flows through the electrical heating wire;

wherein the electrical heating wire is disposed in the seat;

a control unit configured to execute processing; and a switching unit configured to switch the switch on or off, wherein the control unit executes processing for repeatedly calculating an electrical heating wire temperature relating to the electrical heating wire based on the current detected by the current detection unit, and the control unit is further configured to obtain seating information indicating whether or not a person is seated on a seat of a vehicle, and wherein the control unit executes processing for changing a value of a variable that is used in a formula for calculating the electrical heating wire temperature, in accordance with the obtained seating information, and the switching unit switches the switch on or off in accordance with the electrical heating wire temperature calculated by the control unit.

2. The power supply control apparatus according to claim 1, further comprising:

a temperature detection unit configured to detect an ambient temperature of the electrical heating wire, wherein the control unit executes processing for repeatedly calculating the electrical heating wire temperature based on the current detected by the current detection unit and the ambient temperature detected by the temperature detection unit.

3. The power supply control apparatus according to claim 1, wherein the switching unit switches the switch on if the electrical heating wire temperature calculated by the control unit is lower than a first threshold value, and switches the switch off if the electrical heating wire temperature calculated by the control unit is higher than or equal to a second threshold value, and the first threshold value is lower than the second threshold value.

4. The power supply control apparatus according to claim 1, wherein, when power supply to the electrical heating wire is started, the switching unit keeps the switch on until the electrical heating wire temperature calculated by the control unit reaches a fixed target value or higher, and executes PWM control for alternately repeating switching of the switch on and off when the electrical heating wire temperature calculated by the control unit reaches the target value or higher, and the control unit executes processing for decreasing a duty of the PWM control when the calculated electrical heating wire temperature exceeds the target value, and for increasing the duty when the calculated electrical heating wire temperature is lower than the target value.

5. The power supply control apparatus according to claim 1, wherein, when power supply to the electrical heating wire is started, the switching unit keeps the switch on until the electrical heating wire temperature calculated by the control unit reaches a fixed first target value or higher, and executes PWM control for repeatedly switching the switch alternately on and off when the electrical heating wire temperature calculated by the control unit reaches the first target value or higher, and the control unit executes processing for adjusting a duty of the PWM control based on a difference between the calculated electrical heating wire temperature and a fixed second target value, and the second target value exceeds the first target value.

6. The power supply control apparatus according to claim 2, wherein the switching unit switches the switch on if the electrical heating wire temperature calculated by the control unit is lower than a first threshold value, and switches the switch off if the electrical heating wire temperature calculated by the control unit is higher than or equal to a second threshold value, and the first threshold value is lower than the second threshold value.

7. The power supply control apparatus according to claim 2, wherein, when power supply to the electrical heating wire is started, the switching unit keeps the switch on until the electrical heating wire temperature calculated by the control unit reaches a fixed target value or higher, and executes PWM control for alternately repeating switching of the switch on and off when the electrical heating wire temperature calculated by the control unit reaches the target value or higher, and the control unit executes processing for decreasing a duty of the PWM control when the calculated electrical heating wire temperature exceeds the target value, and for increasing the duty when the calculated electrical heating wire temperature is lower than the target value.

8. The power supply control apparatus according to claim 2, wherein, when power supply to the electrical heating wire is started, the switching unit keeps the switch on until the electrical heating wire temperature calculated by the control unit reaches a fixed first target value or higher, and executes PWM control for repeatedly switching the switch alternately on and off when the electrical heating wire temperature calculated by the control unit reaches the first target value or higher, and the control unit executes processing for adjusting a duty of the PWM control based on a difference between the calculated electrical heating wire temperature and a fixed second target value, and the second target value exceeds the first target value.

9. The power supply control apparatus according to claim 1, wherein the variable is one of a temperature difference, a prior temperature difference, an ambient temperature, the electrical heating wire current, and a thermal resistance value.

* * * * *